(12) United States Patent
Gladnick

(10) Patent No.: US 11,249,225 B2
(45) Date of Patent: *Feb. 15, 2022

(54) TUNABLE ACOUSTIC GRADIENT LENS SYSTEM UTILIZING AMPLITUDE ADJUSTMENTS FOR ACQUIRING IMAGES FOCUSED AT DIFFERENT Z-HEIGHTS

(71) Applicant: Mitutoyo Corporation, Kanagawa-ken (JP)

(72) Inventor: Paul Gerard Gladnick, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 250 days.

This patent is subject to a terminal disclaimer.

(21) Appl. No.: 16/723,068

(22) Filed: Dec. 20, 2019

(65) Prior Publication Data

US 2021/0190999 A1    Jun. 24, 2021

(51) Int. Cl.
*G02B 3/14* (2006.01)
*G02B 3/00* (2006.01)
(Continued)

(52) U.S. Cl.
CPC .............. *G02B 3/14* (2013.01); *G01B 11/022* (2013.01); *G01B 11/03* (2013.01); *G01B 11/24* (2013.01);
(Continued)

(58) Field of Classification Search
CPC ....... G01B 11/022; G01B 11/24; G01B 11/03; G02F 1/113; G02F 1/33; G02F 1/29;
(Continued)

(56) References Cited

U.S. PATENT DOCUMENTS

| 6,542,180 B1 | 4/2003 | Wasserman et al. |
| 7,030,351 B2 | 4/2006 | Wasserman et al. |

(Continued)

OTHER PUBLICATIONS

Freerksen et al., "External Reservoir Configuration for Tunable Acoustic Gradient Lens," U.S. Appl. No. 16/000,319, filed Jun. 5, 2018, 45 pages.

(Continued)

*Primary Examiner* — Sang H Nguyen
(74) *Attorney, Agent, or Firm* — Seed IP Law Group LLP

(57) ABSTRACT

A variable focal length lens system includes a tunable acoustic gradient (TAG) lens; a TAG lens controller; and processor(s) configured to: (a) operate the TAG lens controller to drive a periodic modulation of the TAG lens optical power at a TAG lens resonant frequency, using a first amplitude driving signal that provides a first focal Z range extending between peak focus distances Z1max+ and Z1max−; and expose a first image using a first exposure increment approximately at the timing of Z1max+ or Z1max−; (b) adjust the TAG lens controller to drive the periodic modulation using a second amplitude driving signal that provides a second focal Z range extending between peak focus distances Z2max+ and Z2max−; and expose a second image using a second exposure increment approximately at the timing of Z2max+ or Z2max−; and (c) perform processing that includes determining focus metric values for the first and second images.

20 Claims, 9 Drawing Sheets

(51) Int. Cl.
  *G02B 7/02* (2021.01)
  *G01B 11/24* (2006.01)
  *G01B 11/02* (2006.01)
  *G01B 11/03* (2006.01)
  *G02F 1/11* (2006.01)
  G02B 21/36 (2006.01)
  G06T 7/00 (2017.01)
  G02F 1/33 (2006.01)
  G02F 1/29 (2006.01)
  G01N 21/88 (2006.01)

(52) U.S. Cl.
  CPC ........... *G02B 3/0087* (2013.01); *G02B 7/023* (2013.01); *G02F 1/113* (2013.01); *G01N 21/8806* (2013.01); *G02B 21/361* (2013.01); *G02F 1/29* (2013.01); *G02F 1/33* (2013.01); *G06T 7/0004* (2013.01); *G06T 2207/10148* (2013.01)

(58) Field of Classification Search
  CPC ........ G02B 3/0087; G02B 3/14; G02B 7/023; G02B 21/361; G10K 11/30; G01N 21/8806; G06T 2207/10148; G06T 7/0004
  See application file for complete search history.

(56) References Cited

U.S. PATENT DOCUMENTS

| | | | |
|---|---|---|---|
| 7,324,682 B2 | 1/2008 | Wasserman | |
| 7,454,053 B2 | 11/2008 | Bryll et al. | |
| 7,570,795 B2 | 8/2009 | Yu et al. | |
| 7,627,162 B2 | 12/2009 | Blanford et al. | |
| 7,701,643 B2 * | 4/2010 | Batchko | H01L 41/092 359/665 |
| 8,111,905 B2 | 2/2012 | Campbell | |
| 8,111,938 B2 | 2/2012 | Bryll et al. | |
| 8,194,307 B2 | 6/2012 | Arnold et al. | |
| 9,143,674 B2 | 9/2015 | Gladnick | |
| 9,213,175 B2 | 12/2015 | Arnold | |
| 9,256,009 B2 | 2/2016 | Theriault et al. | |
| 9,726,876 B2 | 8/2017 | Bryll | |
| 9,736,355 B1 | 8/2017 | Bryll | |
| 9,774,765 B2 | 9/2017 | Bryll et al. | |
| 9,830,694 B2 | 11/2017 | Bryll | |
| 9,930,243 B2 | 3/2018 | Gladnick et al. | |
| 9,983,459 B2 | 5/2018 | Arnold | |
| 10,101,572 B2 | 10/2018 | Bryll et al. | |
| 10,151,962 B2 | 12/2018 | Gladnick et al. | |
| 10,171,725 B1 * | 1/2019 | Nahum | H04N 5/2251 |
| 10,178,321 B2 | 1/2019 | Emtman et al. | |
| 10,520,650 B2 | 12/2019 | Freerksen et al. | |
| 11,119,382 B2 * | 9/2021 | Gladnick | G02B 21/361 |
| 2006/0093205 A1 * | 5/2006 | Bryll | G06T 7/0004 382/152 |
| 2006/0211802 A1 | 9/2006 | Asgari | |
| 2010/0137990 A1 | 6/2010 | Apatsidis et al. | |
| 2012/0026386 A1 | 2/2012 | Tomita | |
| 2013/0148196 A1 * | 6/2013 | Arnold | G02F 1/11 359/385 |
| 2015/0145980 A1 * | 5/2015 | Bryll | G02B 21/241 348/79 |
| 2016/0025903 A1 | 1/2016 | Arnold | |
| 2017/0052425 A1 | 2/2017 | Arnold | |
| 2017/0078549 A1 | 3/2017 | Emtman et al. | |
| 2017/0324895 A1 * | 11/2017 | Bryll | H04N 5/23216 |
| 2018/0143419 A1 | 5/2018 | Bryll et al. | |
| 2018/0180773 A1 | 6/2018 | Usami et al. | |
| 2019/0369300 A1 | 12/2019 | Freerksen et al. | |

OTHER PUBLICATIONS

Gladnick, "System and Method for Calibrating Variable Focal Length Lens System Using Calibration Object With Planar Tilted Pattern Surface," U.S. Appl. No. 16/232,874, filed Dec. 26, 2018, 85 pages.

Mermillod-Blondin et al., "High-speed varifocal imaging with a tunable acoustic gradient index of refraction lens," Department of Mechanical and Aerospace Engineering, Princeton University, Optics Letters, vol. 33(18), Princeton, New Jersey, Sep. 15, 2008, 3 pages.

Mitutoyo Corporation & Micro Encoder Inc. "QVPAK® 3D CNC Vision Measuring Machine," User's Guide, Version 7, 2003, 329 pages.

* cited by examiner

TUNABLE ACOUSTIC GRADIENT LENS SYSTEM UTILIZING AMPLITUDE ADJUSTMENTS FOR ACQUIRING IMAGES FOCUSED AT DIFFERENT Z-HEIGHTS

FIELD

This disclosure relates to precision metrology, and more particularly to machine vision inspection systems and other optical systems in which a variable focal length lens such as a tunable acoustic gradient (TAG) lens may be utilized to periodically modulate a focus position.

BACKGROUND

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope-type optical system and moves the stage to provide inspection images of either small or relatively large workpieces.

General-purpose precision machine vision inspection systems are generally programmable to provide automated video inspection. Such systems typically include selectable modes of operation as well as GUI features and predefined image analysis "video tools," such that operation and programming can be performed by "non-expert" operators. For example, U.S. Pat. No. 6,542,180, which is hereby incorporated herein by reference in its entirety, teaches a vision system that uses automated video inspection including the use of various video tools.

Multi-lens variable focal length (VFL) optical systems may be utilized for observation and precision measurement of surface heights, and may be included in a microscope and/or precision machine vision inspection system, for example as disclosed in U.S. Pat. No. 9,143,674, which is hereby incorporated herein by reference in its entirety. Briefly, a VFL lens is capable of acquiring multiple images at multiple focal lengths, respectively. One type of known VFL lens is a tunable acoustic gradient ("TAG") lens that creates a lensing effect using sound waves in a fluid medium. The sound waves may be created by application of an electrical field at a resonant frequency to a piezoelectric tube surrounding the fluid medium to create a time-varying density and index of refraction profile in the lens's fluid, which modulates its optical power and thereby the focal length (or effective focus position) of the optical system. A TAG lens may be used to periodically sweep a range of focal lengths (i.e., to periodically modulate its optical power) at a resonant frequency greater than 30 kHz, or greater than 70 kHz, or greater than 100 kHz, or greater than 400 kHz, up to 1.0 MHz for example, at a high speed. Such a lens may be understood in greater detail by the teachings of the article, "High speed varifocal imaging with a tunable acoustic gradient index of refraction lens" (Optics Letters, Vol. 33, No. 18, Sep. 15, 2008), which is hereby incorporated herein by reference in its entirety. TAG lenses and related controllable signal generators are available, for example, from Mitutoyo Corporation of Kanagawa, Japan. As a specific example, SR38 series TAG lenses are capable of periodic modulation having a modulation frequency of up to 1.0 MHz. Various aspects of operating principles and applications of TAG lenses are described in greater detail in U.S. Pat. Nos. 9,930,243; 9,736,355; 9,726,876; 9,143,674; 8,194,307; and 7,627,162; and in US Patent Application Publication Nos. 2017/0078549 and 2018/0143419, each of which is hereby incorporated herein by reference in its entirety.

While such imaging systems including a TAG lens can change the effective focus position at a very high rate, the amount of lighting that can be provided during an image exposure for a given amount of focus change may be relatively limited. An imaging system that can provide improvements with regard to such issues would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A variable focal length (VFL) lens system is provided including a tunable acoustic gradient (TAG) lens, a TAG lens controller, a light source, and objective lens, a camera, a memory and one or more processors. The TAG lens controller controls the TAG lens to periodically modulate the optical power of the TAG lens over a range of optical powers at an operating frequency. The objective lens inputs workpiece light arising from a first workpiece surface, which is illuminated by the light source, and transmits the workpiece light along an imaging optical path that passes through the TAG lens. The camera receives the workpiece light transmitted by the TAG lens along the imaging optical path and provides a corresponding workpiece image exposure.

The memory stores programmed instructions and the one or more processors to execute the programmed instructions to perform operations such as the following. During a first timeframe: the TAG lens controller is operated to drive a periodic modulation of the TAG lens optical power at a resonant frequency of the TAG lens, using a first amplitude driving signal that provides a first amplitude of the periodic modulation at the resonant frequency, the first amplitude corresponding to a first focal Z range extending between peak focus distances Z1max+ and Z1 max−; and the light source and camera are operated to expose a first image using a first exposure increment having a first exposure increment time interval that is approximately centered at the timing of either the peak focus distance Z1max+ or Z1 max−. During a second timeframe: the TAG lens controller is adjusted to drive the periodic modulation of the TAG lens optical power at the resonant frequency of the TAG lens, using a second amplitude driving signal that provides a second amplitude of the periodic modulation at the resonant frequency that is different than the first amplitude of the periodic modulation, the second amplitude corresponding to a second focal Z range extending between peak focus distances Z2max+ and Z2max−, wherein the second focal Z range is different than the first focal Z range; and the light source and camera are operated to expose a second image using a second exposure increment having a second exposure increment time interval that is approximately centered at the timing of either the peak focus distance Z2max+ or Z2max−. In addition, processing is performed that includes determining focus metric values for the first and second images.

In various implementations, the processing includes comparing the focus metric values for the first and second images. In various implementations, the processing includes determining that a focus metric value for the second image is higher than a focus metric value for the first image. In various implementations, the first image and the second image are part of an image stack obtained by the system operating in a points from focus (PFF) mode, and the focus metric values are processed to determine a Z-height of the first workpiece surface.

In various implementations, the focus distance during the first exposure increment moves over a first exposure Z range that is less than 10% of the first focal Z range. In various implementations, the focus distance during the first exposure increment moves over a first exposure Z range that is less than 2 DOF (depth of field) of the system. In various implementations, the focus distance during the second exposure increment moves over a second exposure Z range that is less than 10% of the first focal Z range and/or less than 10% of the second focal Z range.

In various implementations, the first exposure increment time interval is equal to the second exposure increment time interval. In various alternative implementations, the first exposure increment time interval is different than the second exposure increment time interval.

In various implementations, the one or more processors are configured to execute the programmed instructions to further perform operations such as the following. During a third timeframe: the TAG lens controller is adjusted to drive the periodic modulation of the TAG lens optical power at the resonant frequency of the TAG lens, using a third amplitude driving signal that provides a third amplitude of the periodic modulation at the resonant frequency that is different than the first amplitude and the second amplitude of the periodic modulation, the third amplitude corresponding to a third focal Z range extending between peak focus distances Z3max+ and Z3max−, wherein the third focal Z range is different than the first focal Z range and the second focal Z range; and the light source and camera are operated to expose a third image using a third exposure increment having a third exposure increment time interval that is approximately centered at the timing of either the peak focus distance Z3max+ or Z3max−. In addition, the processing that is performed may include determining focus metric values for the first, second and third images.

A method is provided for operating a variable focal length (VFL) lens system comprising a tunable acoustic gradient (TAG) lens and with a workpiece surface in a measurement/imaging volume of the VFL lens system. The method includes the following steps. The optical power of the TAG lens is periodically modulated over a range of optical powers at a resonant frequency of the TAG lens. During a first timeframe: the periodic modulation of the TAG lens optical power is driven, using a first amplitude driving signal that provides a first amplitude of the periodic modulation at the resonant frequency, the first amplitude corresponding to a first focal Z range extending between peak focus distances Z1max+ and Z1 max−; and a light source and a camera are operated to expose a first image using a first exposure increment having a first exposure increment time interval that is approximately centered at the timing of either the peak focus distance Z1max+ or Z1 max−. During a second timeframe: a periodic modulation of the TAG lens optical power is driven, using a second amplitude driving signal that provides a second amplitude of the periodic modulation at the resonant frequency that is different than the first amplitude of the periodic modulation, the second amplitude corresponding to a second focal Z range extending between peak focus distances Z2max+ and Z2max−, wherein the second focal Z range is different than the first focal Z range; and the light source and camera are operated to expose a second image using a second exposure increment having a second exposure increment time interval that is approximately centered at the timing of either the peak focus distance Z2max+ or Z2max−. In addition, processing is performed that includes determining focus metric values for the first and second images.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
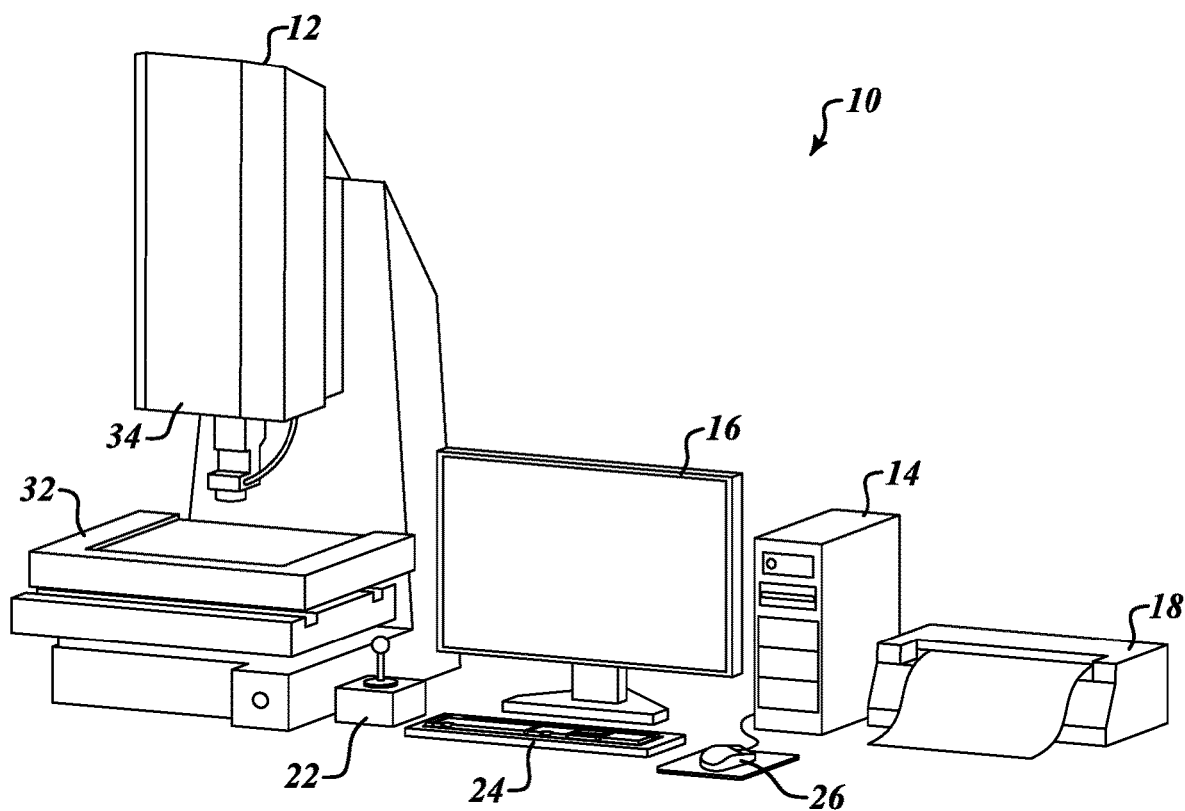
FIG. 1 is a diagram showing various typical components of a general-purpose precision machine vision inspection system.

FIG. 1 is a block diagram of one exemplary machine vision inspection system 10 usable as or including a VFL (TAG) lens system (also referenced herein as an imaging system) in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that, in various implementations, a touchscreen tablet or the like may be substituted for and/or redundantly provide the functions of any or all of the elements 14, 16, 22, 24 and 26.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various implementations of a machine vision inspection system 10 are also described in commonly assigned U.S. Pat. Nos. 7,454,053; 7,324,682; 8,111,905; and 8,111,938, each of which is hereby incorporated herein by reference in its entirety.

Figure 2:
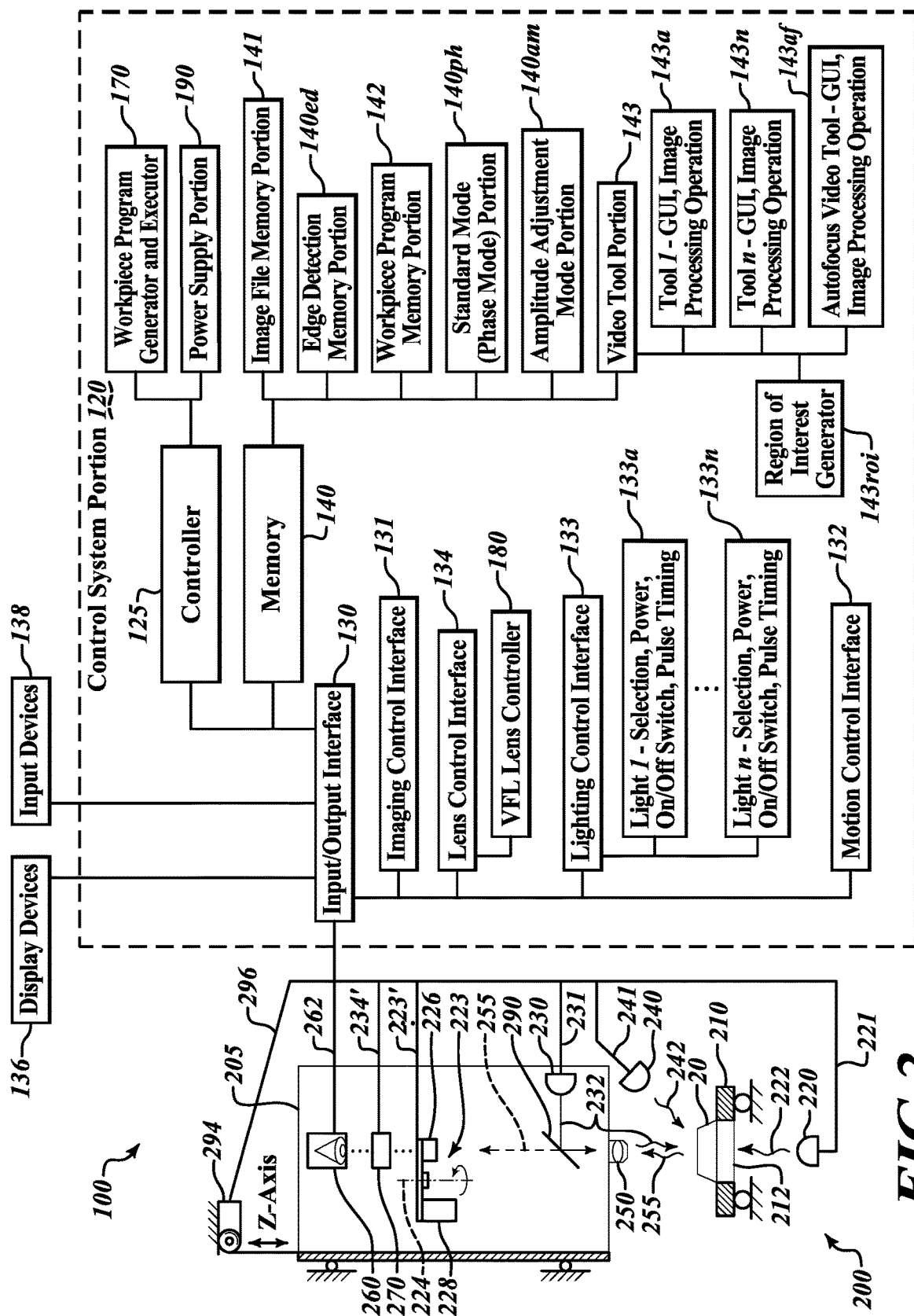
FIG. 2 is a block diagram of a control system portion and a vision components portion of a machine vision inspection system similar to that of FIG. 1 and including certain features disclosed herein.

FIG. 2 is a block diagram of a control system portion 120 and a vision components portion 200 of a machine vision inspection system 100 similar to the machine vision inspection system of FIG. 1, including certain features disclosed herein. As will be described in more detail below, the control system portion 120 is utilized to control the vision components portion 200. The vision components portion 200 includes an optical assembly portion 205, light sources 220, 230, 240, and a workpiece stage 210 having a central transparent portion 212. The workpiece stage 210 is controllably movable along X and Y axes that lie in a plane that is generally parallel to the surface of the stage where a workpiece 20 may be positioned.

The optical assembly portion 205 includes a camera system 260, an interchangeable objective lens 250 and a variable focal length (VFL) lens 270 (e.g., a TAG lens in various exemplary implementations). In various implementations, the optical assembly portion 205 may further include a turret lens assembly 223 having lenses 226 and 228. As an alternative to the turret lens assembly, in various implementations, a fixed or manually interchangeable magnification-altering lens, or a zoom lens configuration, or the like, may be included. In various implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 7.5×, 10×, 20× or 25×, 50×, 100×, etc.).

The optical assembly portion 205 is controllably movable along a Z axis that is generally orthogonal to the X and Y axes by using a controllable motor 294 that drives an actuator to move the optical assembly portion 205 along the Z axis to change the focus of the image of a workpiece 20. The controllable motor 294 is connected to an input/output interface 130 via a signal line 296. As will be described in more detail below, to change the focus of the image over a smaller range, or as an alternative to moving the optical assembly portion 205, the VFL (TAG) lens 270 may be controlled via a signal line 234' by a lens control interface 134 to periodically modulate the optical power of the VFL lens 270 and thus modulate an effective focus position of the optical assembly portion 205. The lens control interface 134 may include a VFL lens controller 180 according to various principles disclosed herein, as described in greater detail below. A workpiece 20 may be placed on the workpiece stage 210. The workpiece stage 210 may be controlled to move relative to the optical assembly portion 205, such that the field of view of the interchangeable objective lens 250 moves between locations on a workpiece 20, and/or among a plurality of workpieces 20, etc.

One or more of a stage light source 220, a coaxial light source 230, and a surface light source 240 (e.g., a ring light) may emit source light 222, 232, and/or 242, respectively, to illuminate a workpiece 20 or workpieces 20. In various exemplary embodiments, strobed illumination may be used. For example, during an image exposure, the coaxial light source 230 may emit strobed source light 232 along a path including a beam splitter 290 (e.g., a partial mirror). The source light 232 is reflected or transmitted as image light 255, and the image light used for imaging passes through the interchangeable objective lens 250, the turret lens assembly 223 and the VFL (TAG) lens 270, and is gathered by the camera system 260. A workpiece image exposure, which includes the image of the workpiece(s) 20, is captured by the camera system 260, and is output on a signal line 262 to the control system portion 120.

Various light sources (e.g., the light sources 220, 230, 240) may be connected to a lighting control interface 133 of the control system portion 120 through associated signal lines (e.g., busses 221, 231, 241, respectively). The control system portion 120 may control the turret lens assembly 223 to rotate along axis 224 to select a turret lens through a signal line or bus 223' to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The lens control interface 134 may include or be connected to a VFL lens controller 180 including circuits and/or routines for controlling various image exposures synchronized with the periodic focus position modulation provided by the VFL (TAG) lens 270. In some implementations, the lens control interface 134 and the VFL lens controller 180 may be merged and/or indistinguishable.

Figure 3:
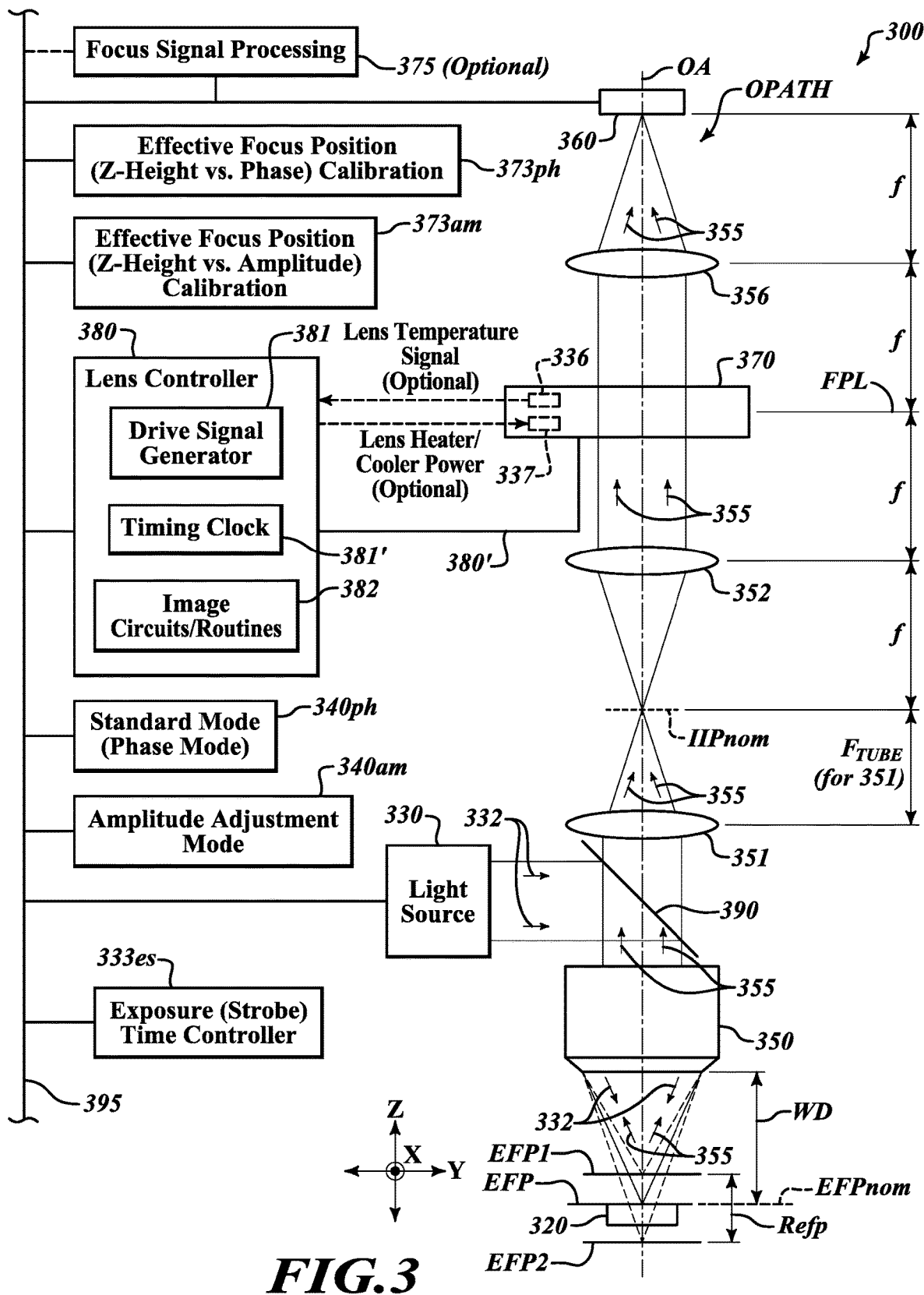
FIG. 3 is a schematic diagram of a VFL (TAG) lens system that may be adapted to a precision non-contact metrology system such as a machine vision inspection system, wherein the TAG lens system is capable of operating in a standard mode (phase mode) and an amplitude adjustment mode of controlling a lens focus position.

The lighting control interface 133 may include lighting control elements 133a-133n that control, for example, the selection, power, on/off switch, and strobe pulse timing, if applicable, for the various corresponding light sources of the machine vision inspection system 100. In some implementations, an exposure (strobe) time controller 333es as shown in FIG. 3 may provide strobe timing signals to one or more of the lighting control elements 133a-133n, such that they provide an image exposure strobe timing that is synchronized with a desired phase time of the VFL lens focus position modulation (e.g., in accordance with certain stored calibration data), and as described in greater detail below. In some implementations, the exposure (strobe) time controller 333es and one or more of the lighting control elements 133a-133n may be merged and/or indistinguishable.

The memory 140 may include an image file memory portion 141, an edge-detection memory portion 140ed, a standard mode (phase mode) portion 140ph, an amplitude adjustment mode portion 140am, a workpiece program memory portion 142 that may include one or more part programs, or the like, and a video tool portion 143. The standard mode (phase mode) portion 140ph is responsible for controlling a lens focus position of the TAG lens 270 using phase timings of a periodically modulated control signal for the TAG lens 270, as described more fully below in reference to FIGS. 4A and 4B. The amplitude adjustment mode portion 140am is responsible for controlling a lens focus position of the TAG lens 270 using amplitude driving signals, as described more fully below in reference to FIGS. 5 and 6A-6F.

The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 includes an autofocus video tool 143af that determines the GUI, image-processing operation, etc., for focus height (i.e., effective focus position (Z-height)) measurement operations. In various implementations, the autofocus video tool 143af may additionally include a high-speed focus height tool that may be utilized to measure focus heights with high speed using hardware illustrated in FIG. 3, as described in more detail in U.S. Pat. No. 9,143,674, which is incorporated above. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding focus characteristic value (e.g., a quantitative contrast metric value and/or a quantitative focus metric value) for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision components portion 200.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

FIG. 3 is a schematic diagram of a VFL (TAG) lens system 300 (also referred to as imaging system 300) that includes a TAG lens 370. The TAG lens system 300 may be adapted to a machine vision system or configured as a standalone system, and may be operated according to principles disclosed herein. In certain applications, the VFL (TAG) lens system 300 may be utilized as part of an "inline" measurement system (e.g., for which workpieces 320 may be moving at a high rate of speed relative to the components of the system, and for which the principles disclosed herein may provide particular advantages, such as in relation to higher illumination energy being provided in shorter image exposure timeframes, as will be described in more detail below). It will be appreciated that certain numbered components 3XX of FIG. 3 may correspond to and/or provide similar operations or functions as similarly numbered components 2XX of FIG. 2, and may be similarly understood unless otherwise indicated.

As will be described in more detail below, an imaging optical path OPATH (also called a workpiece imaging optical path herein) comprises various optical components arranged along a path that conveys image light 355 from the workpiece 320 to the camera 360. The image light is generally conveyed along the direction of their optical axes OA. In the implementation shown in FIG. 3, all the optical axes OA are aligned. However, it will be appreciated that this implementation is intended to be exemplary only and not limiting. More generally, the imaging optical path OPATH may include mirrors and/or other optical elements, and may take any form that is operational for imaging the workpiece 320 using a camera (e.g., the camera 360) according to known principles. In the illustrated implementation, the imaging optical path OPATH includes the TAG lens 370 (which may be included in a 4f imaging configuration) and is utilized at least in part for imaging a surface of a workpiece 320 during a workpiece image exposure.

As shown in FIG. 3, the VFL lens system 300 includes a light source 330, an exposure (strobe) time controller 333es, an objective lens 350, a tube lens 351, a relay lens 352, the VFL (TAG) lens 370, a relay lens 356, a lens controller 380, a camera 360, an effective focus position (Z-height vs. phase) calibration portion 373ph, an effective focus position (Z-height vs. amplitude) calibration portion 373am, and a workpiece focus signal processing portion 375 (optional). In various implementations, the various components may be interconnected by direct connections or one or more data/control busses (e.g., a system signal and control bus 395) and/or application programming interfaces, etc.

As will be described in more detail below, in various implementations, the VFL lens controller 380 may control a drive signal of the TAG lens 370 to periodically modulate optical power of the TAG lens 370 over a range of optical powers that occur at respective phase timings within the periodic modulation. The camera 360 (e.g., including an imaging detector) receives light transmitted along an imaging optical path OPATH through the TAG lens 370 during an image exposure and provides a corresponding camera image. The objective lens 350 inputs image light arising from a workpiece 320 during an image exposure, and transmits the image light along the imaging optical path OPATH through the TAG lens 370 to the camera 360 during the image exposure, to provide a workpiece image in a corresponding camera image. An effective focus position EFP in front of the objective lens 350 during an image exposure corresponds to the optical power of the TAG lens 370 during that image exposure. The exposure time controller 333es is configured to control an image exposure timing used for a camera image.

With respect to the general configuration shown in FIG. 3, the light source 330 may be a "coaxial" or other light source configured to emit the source light 332 (e.g., with strobed or continuous illumination) along a path including a beam splitter 390 (e.g., a partially reflecting mirror as part of a beam splitter) and through the objective lens 350 to a surface of a workpiece 320. The objective lens 350 receives the image light 355 (e.g., workpiece light) that is focused at an effective focus position EFP proximate to the workpiece 320, and outputs the image light 355 to the tube lens 351. The tube lens 351 receives the image light 355 and outputs it to the relay lens 352. In other implementations, analogous light sources may illuminate the field of view in a non-coaxial manner; for example, a ring light source may illuminate the field of view.

In various implementations, the objective lens 350 may be an interchangeable objective lens, and the tube lens 351 may be included as part of a turret lens assembly (e.g., similar to the interchangeable objective lens 250 and the turret lens assembly 223 of FIG. 2). In the implementation shown in FIG. 3, image light 355 arising from a nominal focal plane of the objective lens 350 is focused by the tube lens 351 to form an intermediate image at a nominal intermediate image plane IIPnom. When the TAG lens 370 is in a state where it provides no lensing effect (no optical power), the nominal focal plane of the objective lens 350, the nominal intermediate image plane IIPnom, and the image plane of the camera 360 form a set of conjugate planes, according to known microscope imaging principles. In various implementations, any of the other lenses referenced herein may be formed from or operate in conjunction with individual lenses, compound lenses, etc.

The relay lens 352 receives the image light 355 from the tube lens 351 (or more generally from an intermediate image plane, in various alternative microscope configurations) and outputs it to the TAG lens 370. The TAG lens 370 receives the image light 355 and outputs it to the relay lens 356. The relay lens 356 receives the image light 355 and outputs it to the camera 360. In various implementations, the camera 360 captures a camera image during an image exposure (e.g., during an integration period of the camera 360) also referred to as an image exposure period, and may provide the corresponding image data to a control system portion. Some camera images may include a workpiece image (e.g., of a region of the workpiece 320) provided during a workpiece image exposure. In some implementations, an image exposure (e.g., a workpiece image exposure) may be limited or controlled by a strobe timing of the light source 330 that falls within an image integration period of the camera 360. In various implementations, the camera 360 may have a pixel array greater than 1 megapixel (e.g., 1.3 megapixel, with a 1280×1024 pixel array, with 5.3 microns per pixel).

In the example of FIG. 3, the relay lenses 352 and 356 and the VFL (TAG) lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. In various implementations, the illustrated 4f optical configuration permits placing the VFL (TAG) lens 370 (e.g., which may be a low numerical aperture (NA) device) at the Fourier plane of the objective lens 350. This configuration may maintain the telecentricity at the workpiece 320, and may minimize scale change and image distortion (e.g., including providing constant magnification for each effective focus position (Z-height) of the workpiece 320). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL (TAG) lens 370, so as to minimize image aberrations, etc.

In various implementations, the lens controller 380 may include a drive signal generator portion 381, a timing clock 381', and imaging circuits/routines 382. The drive signal generator portion 381 may operate (e.g., in conjunction with the timing clock 381') to provide a periodic drive signal to the high speed VFL (TAG) lens 370 via a signal line 380' (e.g., for providing and/or adjusting an amplitude driving signal, as will be described in more detail below). In various implementations, the VFL lens system (or imaging system) 300 may comprise a control system (e.g., the control system portion 120 of FIG. 2) that is configurable to operate in conjunction with the lens controller 380 for coordinated operations.

In various implementations, the lens controller 380 may generally perform various functions related to imaging a workpiece 320 in a manner synchronized with a desired phase timing (or a desired peak focus distance timing as associated with an amplitude driving signal) of the TAG lens 370, as well as controlling, monitoring and adjusting the driving and response of the TAG lens 370. In various implementations, the image circuits/routines 382 perform standard imaging operations for the optical system, synchronized with the phase timings (or the peak focus distance timings as associated with amplitude driving signals) of the TAG lens 370.

In various instances, drift in the operating characteristics of the VFL lens may arise due to unwanted temperature variations. As shown in FIG. 3, in various implementations, the imaging system 300 may optionally include the lens heater/cooler 337 associated with the TAG lens 370. The lens heater/cooler 337 may be configured to input an amount of heat energy into the TAG lens 370 and/or perform cooling functions to facilitate heating and/or cooling of the TAG lens 370 according to some implementations and/or operating conditions. In addition, in various implementations, a TAG lens monitoring signal may be provided by a temperature sensor 336 associated with the TAG lens 370 to monitor an operating temperature of the TAG lens 370.

With respect to the general operations of the TAG lens 370, in various implementations as described above, the lens controller 380 may rapidly adjust or modulate its optical power periodically, to achieve a high-speed VFL lens that periodically modulates its optical power at a TAG lens resonant frequency of 400 kHz, 250 kHz, 70 kHz, or 30 kHz, etc., i.e., at a high speed. As shown in FIG. 3, by using the periodic modulation of a signal to drive the TAG lens 370, the effective focus position EFP of the imaging system 300 (that is, the focus position in front of the objective lens 350) may be rapidly moved within a range Refp (e.g., a focus range or an autofocus search range, etc.) bound by an effective focus position EFP1 (or EFPmax or peak focus distance Z1max+) corresponding to a maximum optical power of the TAG lens 370 in combination with the objective lens 350, and an effective focus position EFP2 (or EFPmin or peak focus distance Z1 max−) corresponding to a maximum negative optical power of the TAG lens 370 in combination with the objective lens 350. In various implementations, the effective focus positions EFP1 and EFP2 may approximately correspond to phase timings of 90 degrees and 270 degrees, as will be described in more detail below. For purposes of discussion, the middle of the range Refp may be designated as EFPnom, and may approximately correspond to zero optical power of the TAG lens 370 in combination with the nominal optical power of the objective lens 350. According to this description, EFPnom may approximately correspond to the nominal focal length of the objective lens 350 in some implementations (e.g., which may correspond to a working distance WD of the objective lens 350).

In some implementations, the optional focus signal processing portion 375 may input data from the camera 360 and may provide data or signals that are utilized to determine when an imaged surface region (e.g., of a workpiece 320) is at an effective focus position. For example, a group of images acquired by the camera 360 at different effective focus positions (Z-heights), such as part of an image stack, may be analyzed using a known "maximum contrast" or "best focus image" analysis to determine when an imaged surface region of a workpiece 320 is at a corresponding effective focus position (Z-height). However, more generally, any other suitable known image focus detection configuration may be used. In any case, the workpiece focus signal processing portion 375 or the like may input an image or images acquired during the periodic modulation of the effective focus position (during the sweeping of multiple effective focus positions) of the TAG lens 370, and determine an image and/or image timing at which a target feature (e.g., of a workpiece) is best focused.

In some implementations, the focus signal processing portion 375 may determine a phase timing (or an amplitude driving signal with an associated peak focus distance timing) corresponding to a best focus (e.g., of a workpiece feature) and output that "best focus" phase timing value (or the "best focus" amplitude driving signal having the "best focus" peak focus distance timing) to an effective focus position calibration portion 373*ph* (or 373*am*).

The effective focus position (Z-height vs. phase) calibration portion 373*ph* may store "phase" calibration data determined by calibration processes such as those disclosed in the incorporated references. The effective focus position calibration portion 373*ph* may provide effective focus position (Z-height vs. phase) calibration data that relates respective effective focus positions (Z-heights) to respective "best focus" phase timings within a period of a resonant frequency of the TAG lens 370.

The effective focus position (Z-height vs. amplitude) calibration portion 373*am* may store "amplitude" calibration data determined by calibration processes such as those described in more detail below. The effective focus position calibration portion 373*am* may provide effective focus position (Z-height vs. amplitude driving signal) calibration data that relates respective effective focus positions (Z-heights) to respective "best focus" amplitude driving signals for driving a resonant frequency of the TAG lens 370.

Generally speaking, the effective focus position calibration portions 373*ph* and 373*am* comprise recorded effective focus position (Z-height) calibration data. As such, the representations in FIG. 3 of the calibration portions 373*ph* and 373*am* as separate elements are intended to be a schematic representation only, and not limiting. In various implementations, the associated recorded effective focus position (Z-height) calibration data 373*ph* and 373*am* may be merged with and/or indistinguishable from the lens controller 380, the workpiece focus signal processing portion 375, or a host computer system connected to the system signal and control bus 395, etc.

In various implementations, the exposure (strobe) time controller 333*es* controls an image exposure time of the imaging system 300 (e.g., relative to a phase timing of the periodically modulated effective focus position). More specifically, in the standard (phase) mode, during an image exposure, the exposure (strobe) time controller 333*es* may use the effective focus position (Z-height) calibration data available in the effective focus position (Z-height vs. phase) calibration portion 373*ph* and control the light source 330 to strobe at a respective time. In the amplitude adjustment mode, during an image exposure, the exposure (strobe) time controller 333*es* may provide an exposure increment time interval that is approximately centered at the timing of either peak focus distance Z1max+ or Z1 max− in reference to the calibration data available in the effective focus position (Z-height vs. amplitude) calibration portion 373am and control the light source 330 to strobe at a respective controlled time.

For example, the exposure (strobe) time controller 333es may control the strobe light source to strobe at a respective phase timing within a period of a standard imaging resonant frequency of the TAG lens 370, so as to acquire an image having a particular effective focus position within the sweeping (periodic modulation) range of the TAG lens 370. In other implementations, the exposure time controller 333es may control a fast electronic camera shutter of the camera 360 to acquire an image at a respective controlled time and/or its associated effective focus position. In some implementations, the exposure (strobe) time controller 333es may be merged with or indistinguishable from the camera 360. It will be appreciated that the operations of the exposure time controller 333es and other features and elements outlined above may be implemented to govern workpiece image acquisitions.

Still referring to FIG. 3, the VFL lens system (or imaging system) 300 includes a standard mode (phase mode) portion 340ph and an amplitude adjustment mode portion 340am, which respectively correspond to the standard mode (phase mode) portion 140ph and the amplitude adjustment mode portion 140am of FIG. 2. The standard mode (phase mode) portion 340ph is responsible for operating the TAG lens 370 in a standard (or "normal") mode, in which a single amplitude driving signal (e.g., a maximum amplitude driving signal) is utilized to drive the periodic modulation of the TAG lens 370 optical power, and calibration data from the effective focus position (Z-height vs. phase) calibration portion 373ph is utilized to determine phase timings of the periodic modulation that correspond to Z-heights. The amplitude adjustment mode portion 340am is responsible for operating the TAG lens 370 in an amplitude adjustment mode, in which amplitude driving signals having desired (best focus) amplitude peak timings are used to drive the periodic modulation of the TAG lens 370 optical power, in reference to the effective focus position (Z-height vs. amplitude) calibration portion 373am. In the amplitude adjustment mode, exposure increment time intervals are only provided as corresponding to selected peak phase timings (e.g., 90° and 270°), as will be more fully discussed below. In various embodiments, a user can make a selection for switching between the standard (phase) mode and the amplitude adjustment mode. Alternatively or additionally, the imaging system 300 may make a selection for switching between the modes in response to certain conditions or functions.

Figure 4A:
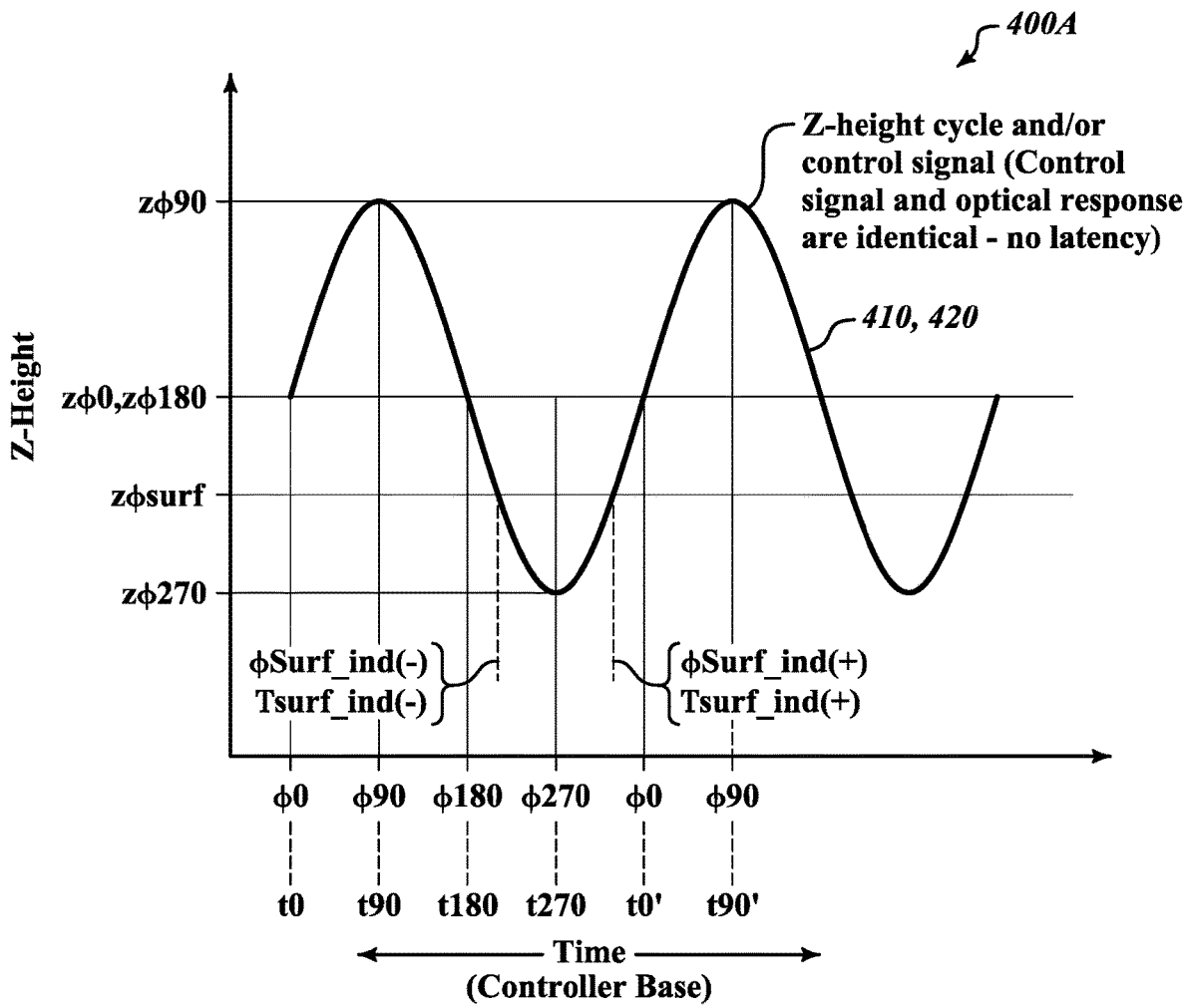
FIG. 4A is a timing diagram illustrating phase timings for a periodically modulated control signal and optical response of the VFL (TAG) lens system of FIG. 3, which is operating in the standard (phase) mode, and also qualitatively showing how strobed illumination can be timed to correspond with a respective phase timing of the periodically modulated focus position to expose an image focused at a respective Z height.

FIG. 4A is a timing diagram 400A illustrating phase timings for a periodically modulated control signal 410 and optical response 420 of the VFL lens system of FIG. 3. In the example of FIG. 4A, an ideal case is illustrated in which the control signal 410 and the optical response 420 have similar phase timings and are thus represented as identical signals, although for which it will be understood that in some instances the signals may be separated by a phase offset, as described in U.S. Pat. No. 9,736,355, which is commonly assigned and is hereby incorporated by reference herein in its entirety. In various implementations, the control signal 410 may be related to the drive signal (e.g., including an amplitude driving signal) that is produced by the drive signal generator 381 of FIG. 3, and the optical response 420 may be representative of the periodically modulated focus position of the imaging system which is controlled by periodically modulating the optical power of the TAG lens 370, as outlined above.

In various implementations, the sinusoidal shapes of the curves 410 and 420 may depend on the lenses in series (e.g., the objective lens 350, TAG lens 370, etc. as illustrated in FIG. 2), for which the optical power of the TAG lens 370 goes through a cycle as indicated in FIG. 4A and is equal to $1/f$ (where f=focal length). As will be described in more detail below, a Z-height versus phase calibration that relates respective Z-heights to respective phase timing signal values may be established by calibration according to known principles (e.g., in accordance with a mathematical model and/or by repeatedly stepping a surface to a known Z-height, and then manually or computationally determining the phase timing that best focuses an image at the known Z-height, and storing that relationship in a lookup table or the like in the effective focus position (Z-height vs. phase) calibration portion 373ph).

The timing diagram 400A illustrates phase timings (e.g., $\phi 0$, $\phi 90$, $\phi 180$, $\phi 270$, etc.) which are equal to respective phase timing signal values (e.g., t0, t90, t180, t270, etc.) of the control signal 410, which correspond to respective Z-heights (e.g., $z\phi 0$, $z\phi 90$, $z\phi 180$, $z\phi 270$, etc.) In various implementations, the phase timing signal values (e.g., t0, t90, t180, t270, etc.) may be determined according to a phase timing signal (e.g., as provided by a clock or other technique for establishing a timing relative to the periodic modulation, etc.) It will be understood that the phase timing signal values shown in the timing diagram 400A are intended to be exemplary only and not limiting. More generally, any phase timing signal value will have an associated focus position Z-height within the illustrated range of focus positions (e.g., the range in the illustrated example having a maximum Z-height $z\phi 90$ and a minimum Z-height $z\phi 270$).

As described above, various techniques (e.g., utilizing points from focus, maximum confocal brightness determinations, etc.) may be used to determine when an imaged surface region is in focus, which may correspond to a Z-height measurement for the imaged surface region. For example, an imaged surface region may be determined to be at a Z-height $z\phi$surf when the imaged surface region is in focus. In the illustrated example utilizing the phase vs Z-height principles, at the phase timing $\phi$surf_ind(−), which is equal to the phase timing signal value Tsurf_ind(−) the focus position is at the Z-height $z\phi$surf, and a workpiece surface region located at the Z-height $z\phi$surf is in focus. Similarly, at the phase timing $\phi$surf_ind(+), which is equal to the phase timing signal value Tsurf_ind(+), the focus position is at the Z-height $z\phi$surf, and the workpiece surface region located at the Z-height $z\phi$surf is in focus. It will be appreciated that such values may be included in the effective focus position (Z-height vs. phase) calibration portion 373ph that relates respective Z-heights to respective phase timing signal values, such that when an imaged surface region is determined to be in focus, the corresponding phase timing signal value (e.g., Tsurf_ind(−)) may be utilized to look-up the corresponding measured Z-height (e.g., Z-height $z\phi$surf) of the imaged surface region.

In the illustrated example, the phase timing signal values Tsurf_ind(−) and Tsurf_ind(+) correspond to movements of the modulated focus position in respective opposite directions. More specifically, the phase timing signal value Tsurf_ind(−) corresponds to movement of the modulated focus position in a first direction (e.g., downward), while the phase timing signal value Tsurf_ind(+) corresponds to movement of the modulated focus position in a second direction (e.g., upward) that is opposite to the first direction.

FIG. 4A also qualitatively shows how strobed illumination can be timed to correspond with a respective phase timing (e.g., φ0, φ90, φ180, φ270, etc.) of the periodically modulated focus position to expose an image focused at a respective Z height (e.g., zφ0, zφ90, zφ180, zφ270, etc.). That is, in the illustrated example, while a digital camera is acquiring an image during an integration period, if a short strobe pulse is provided at the phase timing φ0, then the focus position will be at the height zφ0, and any workpiece surface that is located at the height zφ0 will be in focus in the resulting image. The same will be true for the other exemplary phase timings and Z heights shown in the diagram 400A.

Figure 4B:
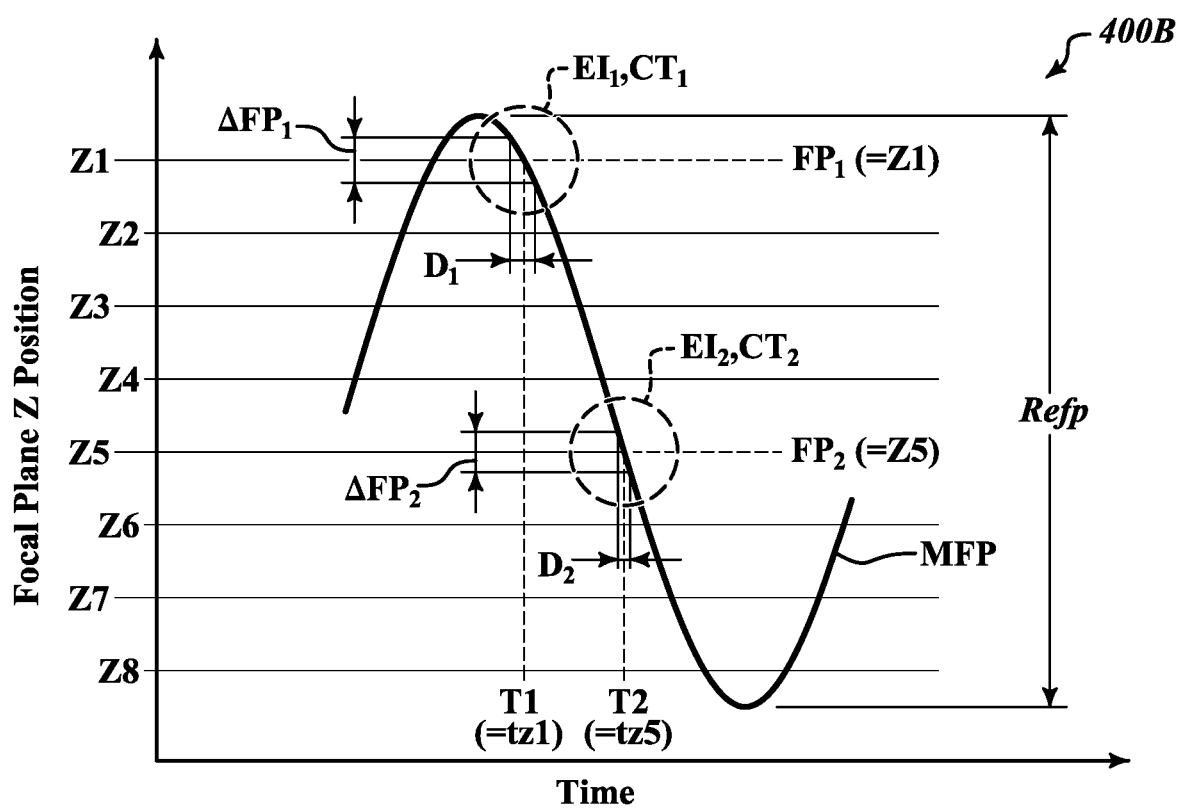
FIG. 4B is another timing diagram illustrating phase timings for a periodically modulated control signal and optical response (a periodically modulated Z height of the focus position) of the VFL (TAG) lens system of FIG. 3, which is operating in the standard (phase) mode.

FIG. 4B shows certain details of one exemplary implementation of a controlled timing CT that may be used to define an effective focus position FP and certain other characteristics to determine a corresponding image exposure increment EI. In particular, the control timing CT may be implemented in a light source strobe operation or camera shutter strobe operation (e.g., as controlled by an exposure time controller 333es) to determine the effective focus position FP and certain other characteristics of a corresponding image exposure increment EI. Certain related techniques are described in more detail in U.S. Pat. No. 10,178,321, which is hereby incorporated herein by reference in its entirety.

In the implementation shown FIG. 4B, each controlled timing CTi comprises a respective increment time Ti and a respective exposure increment time interval Di, and a respective increment illumination intensity Li is used during the respective exposure increment time interval Di. In particular, the illustrated controlled timing CT1 that determines the exposure increment $EI_1$ comprises an increment time T1 and a respective exposure increment time interval D1 (e.g., a timed strobe duration). The illustrated controlled timing CT2 that determines the exposure increment $EI_2$ similarly comprises a respective increment time T2 and an exposure increment time interval D2. It may be seen that each exposure increment time interval is located to provide a central or average increment time that corresponds to a desired focus position. For example, the exposure increment time interval D1 is located to provide the increment time T1(=tz1) corresponding to the desired effective focus position $FP_1$(=Z1), and the exposure increment time interval D2 is located to provide the increment time T2(=tz5) corresponding to the desired effective focus position $FP_2$(=Z5). In various implementations, a respective increment illumination intensity Li is used during a respective exposure increment time interval Di, and each discrete image exposure increment is exposed using a combination of its respective increment illumination intensity Li and its respective exposure increment time interval Di such that the product (Li*Di) is approximately the same for each of the discrete image exposure increments. Such techniques tend to provide equal "weighting" at each of the desired focus positions, which may be advantageous in some implementations.

The implementation shown in FIG. 4B also illustrates that an exposure increment ($EI_2$) corresponding to an effective focus position (FP2), which is relatively closer to the middle of the focus range Refp, comprises a combination of an exposure increment time interval D2 which is relatively shorter and an increment illumination intensity (e.g., L2, not shown) which is relatively larger, and an exposure increment ($EI_1$) corresponding to an effective focus position (FP1), which is relatively farther from the middle of the focus range Refp, comprises a combination of a second exposure increment time interval D1 which is relatively longer and a second increment illumination intensity (e.g., L1, not shown) which is relatively smaller. In various implementations wherein the periodically modulated focus position changes approximately sinusoidally as a function of time, this allows the product (Li*Di) to be approximately the same for each of the discrete image exposure increments while at the same time allowing each respective exposure increment time interval to be controlled to provide approximately the same amount of focus position change ΔFP during each exposure increment time interval. For example, it may be seen that this allows ΔFP1=ΔFP2 in FIG. 4B, even though the rate of focus change is different for each exposure increment due to the sinusoidal focus modulation. Such techniques tend to provide another aspect of equal "weighting" of images at each of the desired focus positions, which may be advantageous in some implementations.

While such techniques provide certain advantages, it will be appreciated that for certain applications the product (Li*Di) may be relatively limited (e.g., as one example (L2*D2) may be relatively limited given the relatively short exposure increment time interval D2 which is utilized to achieve the desired amount of focus position change ΔFP2). More specifically, even if the second increment illumination intensity L2 corresponds to the maximum illumination that a light source can provide, the relatively short exposure increment time interval D2 limits the total amount of illumination for the imaging process. In addition, in order to provide more illumination in such configurations, the system may be required to repeat the exposure time increment over multiple cycles of the modulation (e.g., the exposure increment time interval D2 may be repeated at the corresponding phase timing during a number of cycles of the modulation in order to provide a desired total amount of illumination for the image exposure, for which each cycle adds to the overall exposure timeframe).

For certain applications (e.g., dark workpieces, rapidly moving workpieces, etc.) it may be desirable to provide more illumination for images and to provide the illumination more quickly. For example, for certain "inline" measurement applications, workpieces may be laterally moving at a high speed relative to the VFL (TAG) lens system. As will be described in more detail below, by utilizing different amplitude driving signals and relatively long exposure increment time intervals (e.g., as approximately centered at a timing of a peak focus distance), a relatively large amount of illumination energy may be provided for imaging during a relatively small amount of focus change (e.g., and during a fewer number of cycles of the modulation, such as during only a single or a few cycles). Utilization of such principles as disclosed herein may result in brighter images by at least 10×, 20×, or 30× as compared to the prior art (e.g., and which in some implementations may be provided in at least 10× shorter image exposures, due in part to the large amount of illumination that can provided during a single cycle of the modulation rather than requiring additional cycles of the modulation, etc.)

Figure 5:
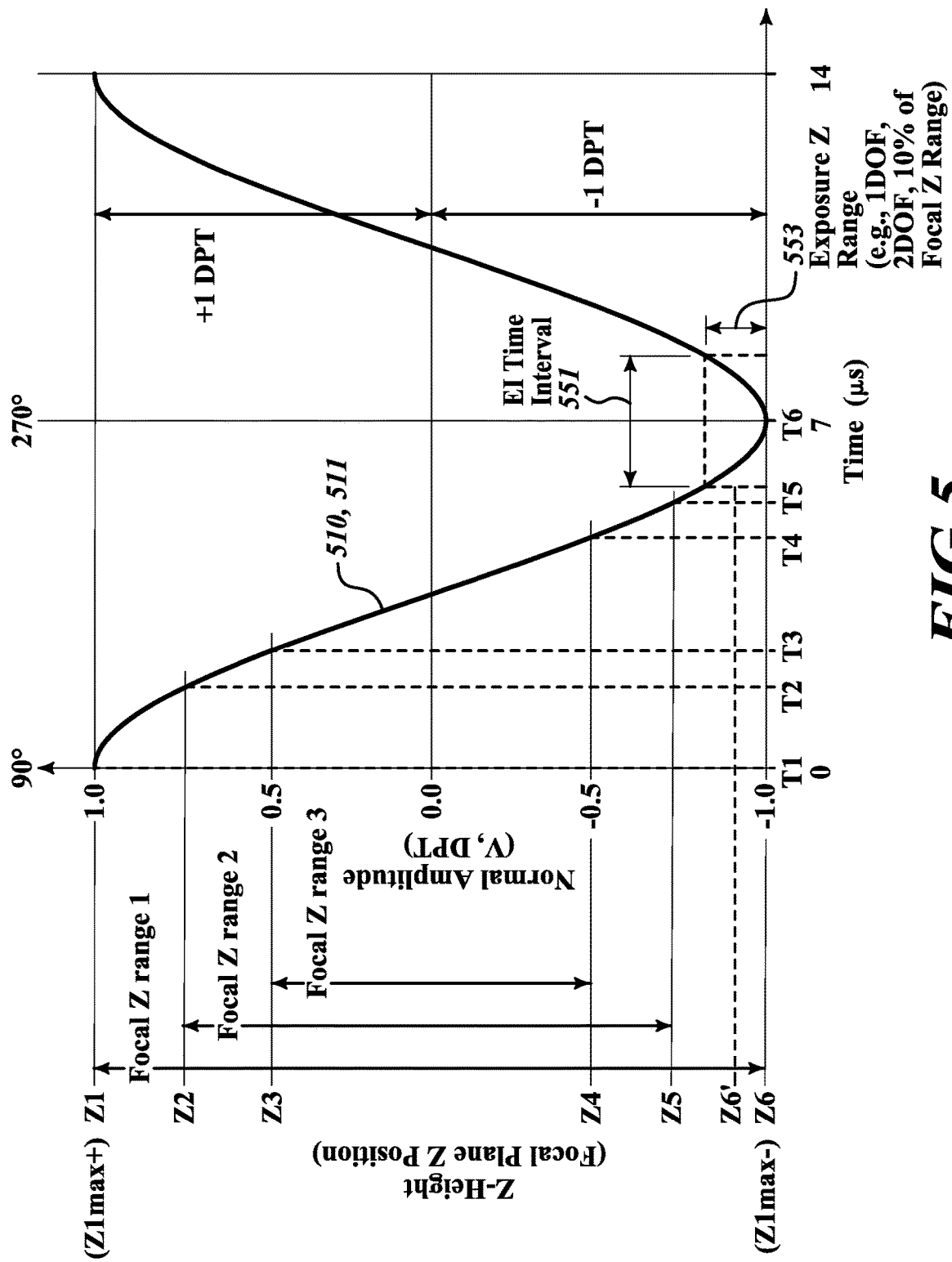
FIG. 5 is a timing diagram illustrating a first amplitude of the periodic modulation of the VFL (TAG) lens system of FIG. 3 in response to a first amplitude driving signal as operating in the amplitude adjustment mode, and also illustrating for comparison certain phase timings as would be utilized in a standard phase mode.

FIG. 5 is a timing diagram illustrating a first amplitude of the periodic modulation 511 of the VFL (TAG) lens system of FIG. 3 in response to a first amplitude driving signal 510 as operating in the amplitude adjustment mode, and also illustrating for comparison certain phase timings as would be utilized in a standard phase mode. The amplitude driving signal 510 may be the drive signal that is produced by the drive signal generator 381 of FIG. 3, and the periodic modulation 511 may be representative of the periodically modulated focus position of the VFL (TAG) lens system 300 which is controlled by the amplitude driving signal 510. In the example of FIG. 5, an ideal case is illustrated (similar to the example of FIG. 4A) in which the amplitude driving signal 510 and the periodic modulation 511 (e.g., the optical response) have similar phase timings and are thus represented as identical signals, although for which it will be understood that in some instances the signals may be separated by a phase offset, as described for example in the previously incorporated '355 patent.

In the amplitude adjustment mode, the amplitude driving signal 510 is used to drive the periodic modulation 511 of the TAG lens optical power at a resonant frequency of the TAG lens 370. In FIG. 5, the horizontal axis represents time, and the vertical axis represents Z-heights of the periodic modulation 511 and the amplitude of the periodically modulated control signal 510 (the amplitude driving signal 510) for the TAG lens 370, wherein the amplitude is normalized to a maximum value of 1.0. As will be described in more detail below, a Z-height versus amplitude calibration that relates respective Z-heights to respective amplitude driving signals with associated peak focus distance timings may be established by calibration (e.g., in accordance with a mathematical model and/or by repeatedly stepping a surface to a known Z-height, and then manually or computationally determining the amplitude driving signal with a peak timing that best focuses an image at the known Z-height, and storing that relationship in a lookup table or the like in the effective focus position (Z-height vs. amplitude) calibration portion 373am).

In FIG. 5, the amplitude driving signal 510 is set to vary over a maximum range from 1.0 to −1.0. This results in a first amplitude of the periodic modulation 511, which corresponds to a first focal Z range extending between peak focus distances Z1 (i.e., Z1max+) and Z6 (i.e., Z1max−). In various implementations, the first amplitude driving signal 510 may be selected based on a first target focus distance Z6'. As will be described in more detail below, for the periodic modulation 511, a first peak focus distance timing T6 may be approximately centered within an exposure increment (EI) time interval 551, and for which the target focus distance Z6' may fall within (e.g., approximately centered in) an exposure Z range 553.

Figure 6A:
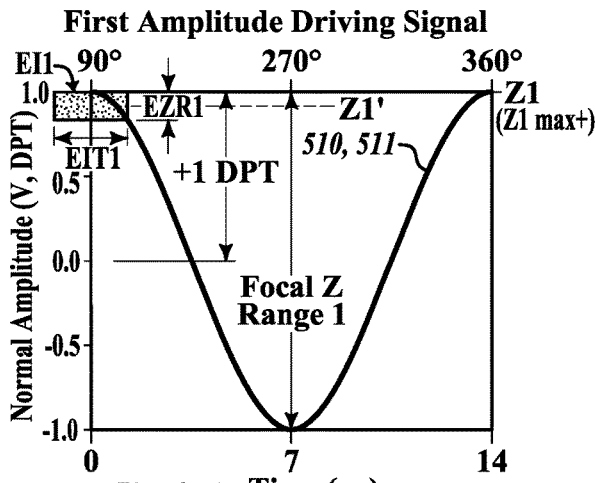
FIGS. 6A-6F respectively illustrate different amplitudes of periodic modulation of the VFL (TAG) lens system of FIG. 3 as resulting from different amplitude driving signals.
Figure 6B:
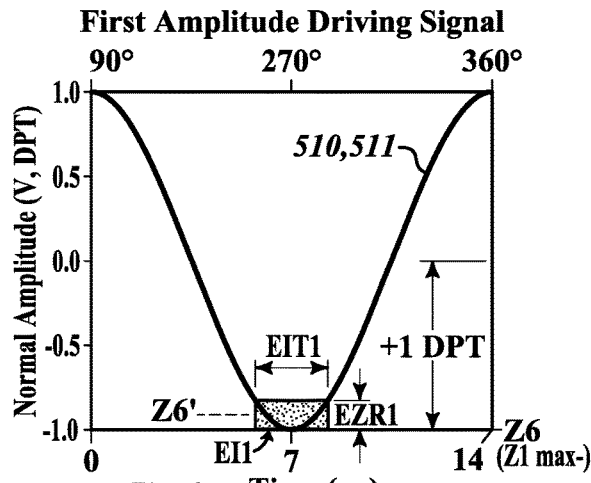
Figure 6C:
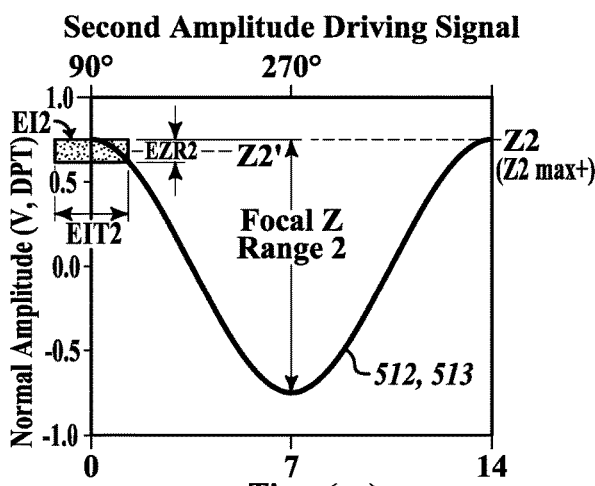
Figure 6D:
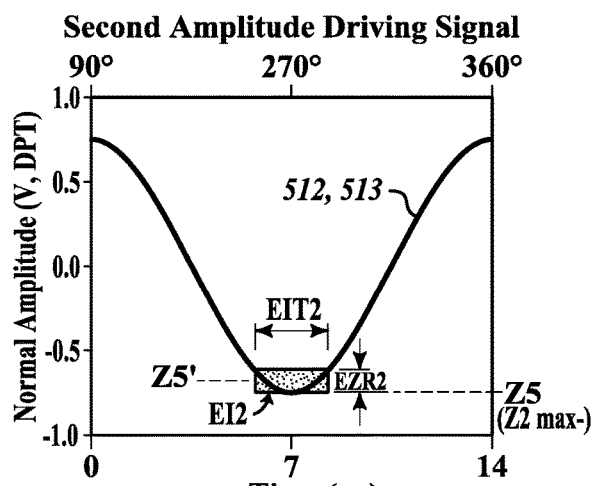
Figure 6E:
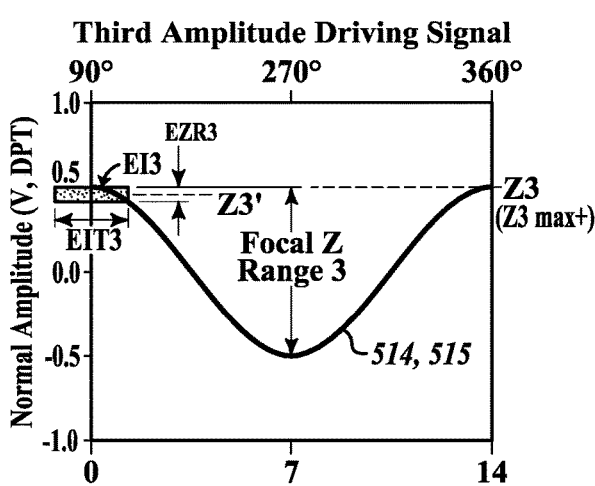
Figure 6F:
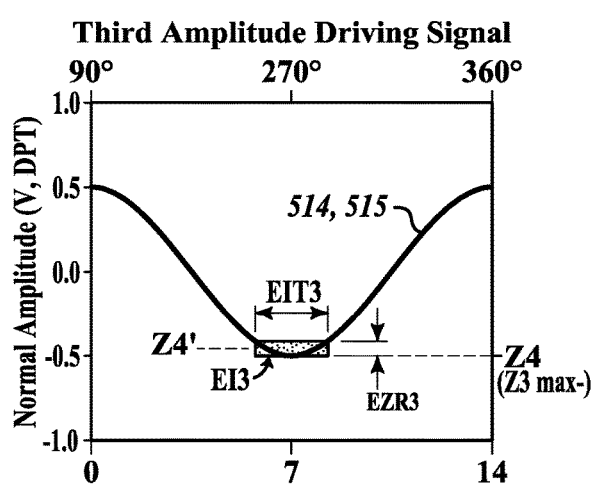

As will be described in more detail below with respect to FIGS. 6A-6F, different amplitude driving signals may be selected/utilized that correspond to different focal Z ranges of the periodic modulation. For example, FIGS. 6A and 6B illustrate the same first amplitude driving signal as FIG. 5, which corresponds to a first focal Z range (i.e., from Z1 to Z6), FIGS. 6C and 6D illustrate a second amplitude driving signal that corresponds to a second focal Z range (i.e., from Z2 to Z5) and FIGS. 6E and 6F illustrate a third amplitude driving signal that corresponds to a third focal Z range (i.e., from Z3 to Z4). For purposes of comparison with the maximum amplitude driving signal 510, each of these ranges is illustrated in FIG. 5. The ranges and corresponding peak Z-heights also help illustrate certain aspects in relation to phase timings as would be utilized in a standard phase mode, as will be described in more detail below.

As illustrated in FIG. 5, if a standard phase mode was being utilized, the phase timings of T1, T2, and T3 (i.e., for positive optical powers) may be utilized to correspond to heights Z1, Z2, and Z3, respectively, and the phase timings of T6, T5 and T4 (i.e., for negative optical powers) may be utilized to correspond to Z-heights Z6, Z5 and Z4, respectively. As will be described in more detail below, in accordance with the amplitude adjustment mode, rather than utilizing the different phase timings to correspond to the different Z heights, different amplitude driving signals may be utilized.

In relation to certain aspects as illustrated in FIG. 5, a difference between the values of 1.0 and 0.0 for positive optical powers corresponds to +1 DPT, and a difference between values of 0.0 and −1.0 for negative optical powers corresponds to −1 DPT. As used herein, DPT means optical power of the TAG lens 370 in diopter and represents one half of a resonant range (focal Z range) of the periodic modulation of the TAG lens optical power at a resonant frequency of the TAG lens 370.

In accordance with various exemplary embodiments, the imaging system 300 may be operated in the amplitude adjustment mode, in which an amplitude driving signal is used to drive a periodic modulation of the TAG lens optical power (e.g., so that a target focus distance will fall within an exposure Z range of an image exposure increment time interval that corresponds to a peak (or trough) of the periodic modulation). In FIG. 5, an exposure increment (EI) time interval 551 is approximately centered at the timing of a negative peak focus distance Z1 max− as corresponding to the Z height Z6. Due to the sinusoidal focus modulation as illustrated in FIG. 5, at the peak timing, the rate of optical response change (focus distance change, or focus position change, ΔFP) is relatively small, which makes it possible to make the corresponding exposure increment time interval (e.g., a timed strobe duration) relatively long (e.g., as approximately centered at the peak timing). In other words, for a given maximum amount of ΔFP (focus position change), which defines an exposure Z range 553, the longest corresponding exposure increment time interval is at a peak timing. As a result, it becomes possible to provide a relatively large amount of illumination energy for imaging a workpiece (e.g., with a surface at a target distance within the exposure Z range 553), during the (relatively long) exposure increment time interval 551, as shown in FIG. 5. The capability to apply such higher illumination energy for imaging in turn results in brighter images by at least 10×, 20×, or 30× as compared to the prior art.

In some implementation examples, when the exposure Z range 553 is 1 DOF, the corresponding exposure increment time interval 551 may be about 2.032 μs for a 70 kHz resonant frequency, and when the exposure Z range 553 is 2 DOF, the corresponding exposure increment time interval 551 may be about 2.774 μs for the 70 kHz resonant frequency (e.g., as compared to certain prior systems with a corresponding exposure increment time interval of about 0.080 μs for a 70 kHz resonant frequency).

While the above describes the higher illumination energy imaging at the negative peak focus distance Z1 max− as corresponding to the Z height Z6, the same higher illumination energy imaging is similarly possible at a positive peak focus distance Z1max+ as corresponding to the Z height Z1, as will be apparent to those skilled in the art. In the illustrated example, the peak timings correspond to phase timings of 90° and 270°, though the corresponding phase timings are not limited to this example and may be, for example 0° and 180° or any other phase timings (e.g., as separated by 180°).

Thus, FIG. 5 illustrates how the depicted amplitude driving signal 510 can be used to drive the periodic modulation of the TAG lens optical power, wherein the amplitude corresponds to a focal Z range ("Focal Z range 1" in FIG. 5) extending between peak focus distance Z1max+ and Z1 max−. As will be more fully described below, the Z-height vs. amplitude calibration data in the effective focus position (Z-height vs. amplitude) calibration portion 373am relates different amplitude driving signals peak focus distance timing to different target focus distances Ztarget-i. Thus, if a particular target focus distance Ztarget-1 is known, the calibration data may indicate which amplitude driving signal corresponds to the particular target focus distance Ztarget-1 and thus is suitable for measuring and/or imaging a surface located at the particular target focus distance Ztarget-1. In the example of FIG. 5, the calibration data may indicate that the amplitude driving signal 510, which can measure/image the Z height Z6', is suitable for measuring/imaging a particular target focus distance Ztarget-1 if Ztarget-1 is known or expected to be at or near the Z height Z6' (or at or near a Z height Z1' as will be described in more detail below with respect to FIG. 6A).

As noted above, with respect to first target focus distance Z6', a first peak focus distance timing T6 may be approximately centered within an exposure increment (EI) time interval 551, and for which the target focus distance Z6' may fall within (e.g., be approximately centered in) an exposure Z range 553. It is noted that the target focus distance Z6' may be near to but different than the Z-height Z6. This occurs because it may be desirable in various implementations for the target focus distance Z6' to fall within a middle of the exposure Z range 553 (i.e., rather than occurring near or at one end of the exposure Z range). Thus, the calibration data that is stored (e.g., as part of calibration data 373am) may relate the amplitude driving signal 510 with a peak focus distance timing of T6 (e.g., corresponding to a timing of 7 us in the scale of FIG. 5) to the Z-height Z6' rather than the Z-height Z6. In various implementations, the calibration data may also or alternatively store the phase timing corresponding to the start of the exposure increment time interval 551 and/or such timing may be determined by other components of the system in relation to the peak focus distance timing of T6 (e.g., in order to determine the start time for an illumination pulse corresponding to the exposure increment time interval 551). After the calibration data is stored, when a Ztarget-1 is known or expected to be at or near the Z height Z6', the calibration data will indicate that the amplitude driving signal 510 should be utilized (e.g., with a exposure increment time interval 551 approximately centered at the peak focus distance timing of T6).

Still referring to FIG. 5, if the target focus distance Ztarget-1 is instead near the Z heights Z2 or Z5 defining "Focal Z range 2," or near the Z heights Z3 or Z4 defining "Focal Z range 3," then the depicted amplitude driving signal 510 is not suitable for measuring or imaging the target focus distance Ztarget-1 because Ztarget-1 is not at or near the positive or negative focus peaks corresponding to the amplitude driving signal 510. Thus, a different amplitude driving signal should be selected whose corresponding focus peaks approximately coincide with the known or expected Ztarget-1 (e.g., near Z2 or Z5, or Z3 or Z4).

FIGS. 6A and 6B, 6C and 6D, and 6E and 6F respectively illustrate use of three different amplitude driving signals 510, 512, and 514, suitable for measuring or imaging the target focus distance Ztarget-1 located at or near the Z heights of Z1' or Z6', Z2' or Z5', and Z3' or Z4', respectively (e.g., as may be near the Z heights of Z1 or Z6, Z2 or Z5, and Z3 or Z4, similar to the relationship of Z6' to Z6, as described above).

FIGS. 6A and 6B correspond to FIG. 5 described above. FIGS. 6A and 6B illustrate that a first amplitude driving signal 510 is used to drive a periodic modulation 511 of the TAG lens optical power at a resonant frequency of the TAG lens 370. The first amplitude driving signal 510 provides a first amplitude of the periodic modulation 511 at the resonant frequency, wherein the first amplitude corresponds to the first focal Z range, "Focal Z range 1," extending between peak focus distances Z1max+ (Z1) and Z1 max– (Z6). The first amplitude driving signal 510 is selected based on a first target focus distance Ztarget-1 and stored calibration data, wherein the calibration data relates different amplitude driving signals to different target focus distances Ztarget-i and indicates that the first amplitude driving signal 510 corresponds to the first target focus distance Ztarget-1, which is expected to be at or near the focus distances Z1' or Z6' (e.g., which in various implementations may be proximate to the peak focus distances Z1max+ (Z1) or Z1 max– (Z6), respectively).

In operation, the light source 330 and the camera 360 (FIG. 3) are controlled to expose an image using at least one exposure increment EI1 having an exposure increment time interval EIT1, wherein the focus distance during the exposure increment EI1 moves over a first exposure Z range EZR1 that includes the target focus distance Ztarget-1.

In various implementations, the exposure increment time interval EIT1 is approximately centered at the timing of either peak focus distance Z1max+ (Z1) or Z1 max– (Z6). In various implementations, the first exposure Z range EZR1 is less than 2 DOF, such as 1 DOF, or is less than 10% of the first focal Z range "Focal Z range 1." In various implementations, Ztarget-1 falls within the first exposure Z range EZR1 (e.g., falling approximately within the middle of the range). In various implementations, Ztarget-1 is proximate to either the peak focus distance Z1max+ (Z1) or Z1 max– (Z6) in that the difference between Ztarget-1 and the proximate peak focus distance is less than 10% of the first focal Z range "Focal Z range 1" or is less than 2 DOF.

In various implementations, the light source 330 is operated to provide pulse light with a first phase pulse timing (e.g. 90° or 270°) that corresponds to the timing of the peak focus distance Z1max+ (Z1) or Z1 max– (Z6). In various implementations, the camera 360 is operated to acquire an image of a first workpiece feature at the first target focus distance Ztarget-1 as illuminated by the pulse light at the first phase pulse timing (e.g. 90° or 270°).

As used herein, that the first phase pulse timing "corresponds" to the timing of the peak focus distance Z1max+ or Z1 max– means broadly that, in various implementations, the first phase pulse timing is configured and timed so that the timing of the peak focus distance Z1max+ or Z1max– occurs during (e.g., approximately at the center of) the exposure increment time interval. For example, the exposure increment time interval may in some implementations be equal to a pulse duration and may begin at the first phase pulse timing. In some implementations, the phase pulse timing may correspond to the timing of the peak focus distance Z1max+ or Z1 max– in that the first phase pulse timing may precede the timing of the peak focus distance Z1max+ or Z1max– by ½ the pulse duration (e.g., ½ the exposure increment time interval).

In various implementations, the exposure operation as illustrated in FIG. 6A or 6B may be cyclically repeated to provide repeated exposure increments corresponding to the Z-height Z1' or Z6' to perform robust measurement/imaging. That is, while FIGS. 6A and 6B each depict one cycle of the first amplitude driving signal 510, two or more cycles of the first amplitude driving signal 510 may be used with corresponding exposure increments to expose an image corresponding to the Z-height Z1' or Z6'. In such implementations, one exposure of an image may be considered as comprising a plurality of exposure time increments that are repeated cyclically, each using the same exposure increment time interval.

FIGS. 6C and 6D illustrate that a second amplitude driving signal 512 is used to drive a periodic modulation 513 of the TAG lens optical power at a resonant frequency of the TAG lens 370. The second amplitude driving signal 512 provides a second amplitude of the periodic modulation 513 at the resonant frequency, wherein the second amplitude corresponds to the second focal Z range, "Focal Z range 2," extending between peak focus distances Z1max+ (Z2) and Z1 max− (Z5). The second amplitude driving signal 512 may be selected based on a second target focus distance Ztarget−2 and stored calibration data, wherein the calibration data relates different amplitude driving signals to different target focus distances Ztarget−i and indicates that the second amplitude driving signal 512 corresponds to the second target focus distance Ztarget−2, which is expected to be at or near the focus distances Z2' or Z5' (e.g., which in various implementations may be proximate to the peak focus distances Z1max+ (Z2) or Z1 max− (Z5), respectively).

In operation, the light source 330 and the camera 360 are controlled to expose an image using at least one exposure increment $EI_2$ having an exposure increment time interval EIT2, wherein the focus distance during the exposure increment $EI_2$ moves over a second exposure Z range EZR2 that includes the second target focus distance Ztarget−2.

In various implementations, the exposure increment time interval EIT2 is approximately centered at the timing of either peak focus distance Z1max+ (Z2) or Z1max− (Z5). In various implementations, the second exposure Z range EZR2 is less than 2 DOF, such as 1 DOF, or is less than 10% of the first focal Z range "Focal Z range 1." (e.g., and in some implementations may also be less than 10% of the second focal Z range "Focal Z range 2"). In various implementations, Ztarget−2 falls within the second exposure Z range EZR2 (e.g., falling approximately within the middle of the range). In various implementations, the second target focus distance Ztarget−2 is proximate to the peak focus distance Z1max+ (Z2) or Z1 max− (Z5) in that the difference between Ztarget−2 and the proximate peak focus distance is less than 10% of the first focal Z range "Focal Z range 1" (e.g., and in some implementations may also be less than 10% of the second focal Z range "Focal Z range 2") or is less than 2 DOF.

In various implementations, the light source 330 is operated to provide pulse light with a phase pulse timing (e.g. 90° or 270°) that corresponds to the timing of the peak focus distance Z1max+ (Z2) or Z1 max− (Z5). In various implementations, the camera 360 is operated to acquire an image of a workpiece feature at the second target focus distance Ztarget−2 as illuminated by the pulse light at the phase pulse timing (e.g. 90° or 270°).

In various implementations, the exposure operation as illustrated in FIG. 6C or 6D may be cyclically repeated to provide repeated exposure increments corresponding to the Z-height Z2' or Z5' to perform robust measurement/imaging. That is, while FIGS. 6C and 6D each depict one cycle of the second amplitude driving signal 512, two or more cycles of the second amplitude driving signal 512 may be used with corresponding exposure increments to expose an image corresponding to the Z-height Z2 or Z5. In such implementations, image exposure may be considered as comprising a plurality of exposure time increments that are repeated cyclically, each using the same exposure increment time interval.

FIGS. 6E and 6F illustrate that a third amplitude driving signal 514 is used to drive a periodic modulation 515 of the TAG lens optical power at a resonant frequency of the TAG lens 370. The third amplitude driving signal 514 provides a third amplitude of the periodic modulation 515 at the resonant frequency, wherein the third amplitude 515 corresponds to the third focal Z range, "Focal Z range 3," extending between peak focus distances Z1max+ (Z3) and Z1 max− (Z4). The third amplitude driving signal 514 may be selected based on a third target focus distance Ztarget−3 and stored calibration data, wherein the calibration data relates different amplitude driving signals to different target focus distances Ztarget−i and indicates that the third amplitude driving signal 514 corresponds to the third target focus distance Ztarget−3, which is expected to be at or near the focus distances Z3' or Z4' (e.g., which in various implementations may be proximate to the peak focus distances Z1max+ (Z3) or Z1max− (Z4), respectively).

In operation, the light source 330 and the camera 360 are controlled to expose an image using at least one exposure increment EI3 having an exposure increment time interval EIT3, wherein the focus distance during the exposure increment EI3 moves over a third exposure Z range EZR3 that includes the third target focus distance Ztarget−3.

In various implementations, the exposure increment time interval EIT3 is approximately centered at the timing of either peak focus distance Z1max+ (Z3) or Z1max− (Z4). In various implementations, the third exposure Z range EZR3 is less than 2 DOF, such as 1 DOF, or is less than 10% of the first focal Z range "Focal Z range 1." In various implementations, Ztarget−3 falls within the first exposure Z range EZR3 (e.g., falling approximately within the middle of the range). In various implementations, the third target focus distance Ztarget−3 is proximate to the peak focus distance Z1max+(Z3) or Z1 max− (Z4) in that the difference between Ztarget−3 and the proximate peak focus distance is less than 10% of the first focal Z range "Focal Z range 1" or is less than 2 DOF.

In various implementations, the light source 330 is operated to provide pulse light with a phase pulse timing (e.g. 90° or 270°) that corresponds to the timing of the peak focus distance Z1max+ (Z3) or Z1 max− (Z4). In various implementations, the camera 360 is operated to acquire an image of a workpiece feature at the third target focus distance Ztarget−3 as illuminated by the pulse light at the phase pulse timing (e.g. 90° or 270°).

In regard to the implementations of FIGS. 6A-6F, it will be appreciated that if a constant exposure increment time interval EIT is used (e.g., as corresponding to a constant pulse light interval or duration), all of the exposure increment time intervals EIT1-EIT3 will be the same, and the corresponding exposure Z ranges EZR1-EZR3 will vary (e.g., as illustrated in FIGS. 6A-6F). More specifically, EZR2 may be smaller than EZR1, and EZR3 may similarly be smaller than EZR2 (and may in some implementations be approximately ½ the size of EZR1, for which the "Focal Z Range 3" is noted to be ½ the size of the "Focal Z Range 1"). In an implementation where the amplitude driving signal 510 and the periodic modulation 511 correspond to a maximum amplitude driving signal of the system, as noted above the exposure increment time interval EIT1 may be set so that the exposure Z range EZR1 is a certain value relative to DOF and/or a percentage of the "Focal Z Range 1" (e.g., as corresponding to an amount of focus change that is acceptable/specified, etc. for an exposure increment time interval). For example, the exposure increment time interval EIT1 may be set so that the exposure Z range EZR1 is approximately 1 DOF (i.e., as may correspond to ⅟₂₅ of the "Focal Z Range 1" in some implementations), or is approximately 2 DOF (i.e., as may correspond to approximately ⅖₅ of the "Focal Z Range 1" in some implementations), or is approximately some other percentage of the "Focal Z Range 1" (e.g., 5%, 10%, etc.) In such implementations, if a constant exposure increment time interval EIT is used (i.e., for which all of the exposure increment time intervals EIT1-EIT3 will be the same), as noted above the corresponding exposure Z ranges EZR2 and EZR3 will be less than EZR1 (and thus would also correspondingly be a lower percentage of the "Focal Z Range 1").

As described herein, in various implementations, different exposure increment time intervals may be utilized. In some implementations, EIT2 may be longer than EIT1, and EIT3 may be longer than EIT2. In one such implementation, the exposure increment time intervals may be implemented or otherwise set so as to result in the exposure Z ranges EZR being more consistent or even constant (e.g., wherein EZR1, EZR2 and EZR3 may be similar or identical to one another). In various implementations, both the exposure increment time intervals and the exposure Z ranges may be made to vary (e.g., and in certain implementations, a light intensity for the images may be made to vary as well). As will be described in more detail below, in certain implementations, it may be desirable to have a first exposure increment time interval utilized for the acquisition of a first set of images in an image stack (e.g., for odd numbered images), and a second exposure increment time interval (i.e., that is different than the first exposure increment time interval) utilized for the acquisition of a second set of images in an image stack (e.g., for even numbered images), such as may result in high dynamic range imaging (e.g., permitting a single height map computation on fields of view including both very dark and very bright features of interest at the same time).

In various implementations, the exposure operation as illustrated in FIG. 6E or 6F may be cyclically repeated to provide repeated exposure increments corresponding to the Z-height Z3' or Z4' to perform robust measurement/imaging. That is, while FIGS. 6E and 6F each depict one cycle of the third amplitude driving signal 514, two or more cycles of the third amplitude driving signal 514 may be used with corresponding exposure increments to expose an image corresponding to the Z-height Z3' or Z4'. In such implementations, one image exposure may be considered as comprising a plurality of exposure time increments that are repeated cyclically, each using the same exposure increment time interval.

Figure 7:
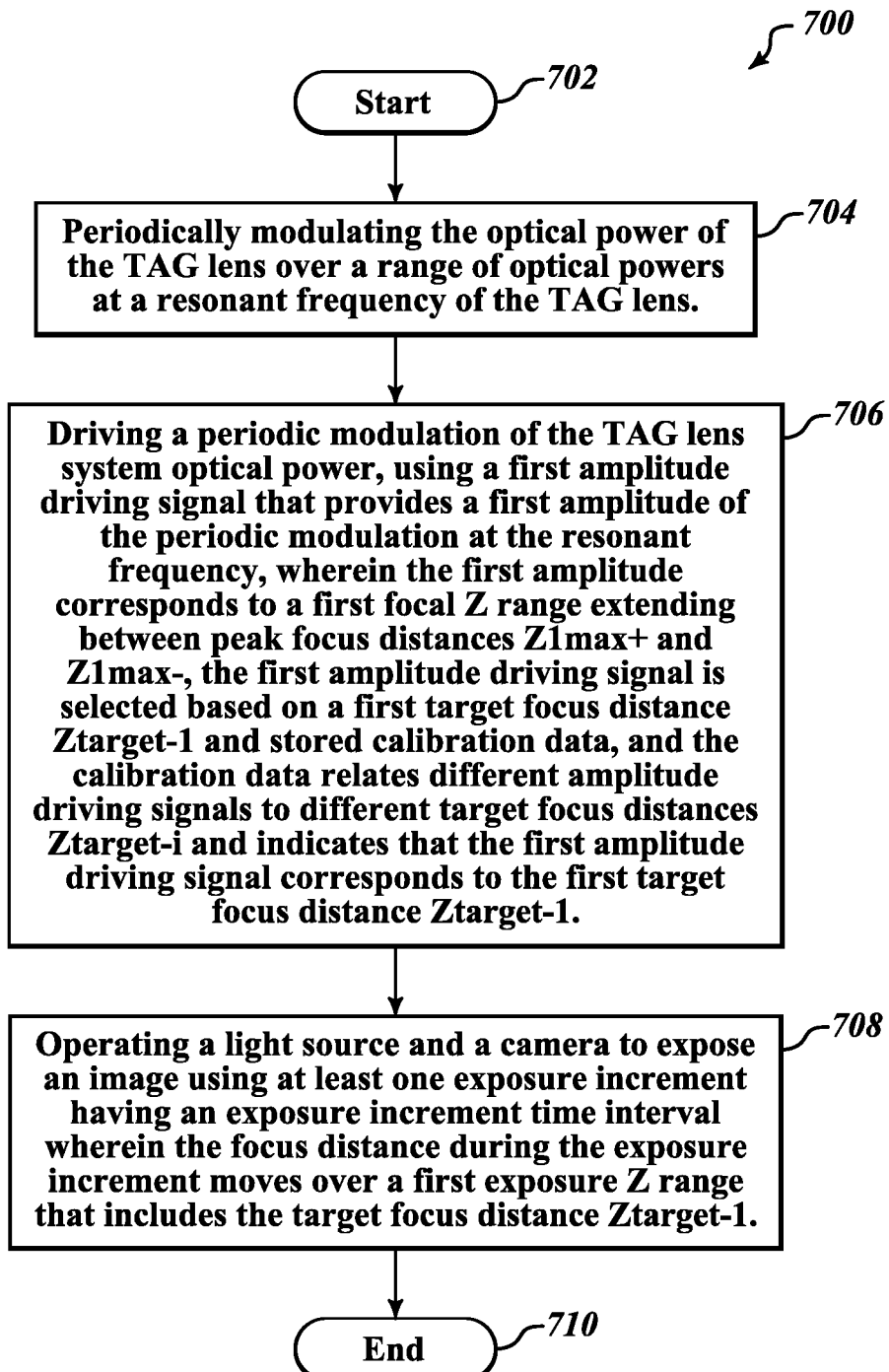
FIG. 7 is a flow diagram showing one example of a method for operating a VFL (TAG) lens system with amplitude adjustment corresponding to Z-height according to principles disclosed herein.

FIG. 7 is a flow diagram showing one example of a method for operating a VFL lens system 300 comprising a TAG lens 370, to measure or image a workpiece surface in a measurement/imaging volume of the TAG lens system, wherein the measurement/imaging volume may be on or adjacent to the workpiece stage 210 (FIG. 2) on which the workpiece 20 having the workpiece surface is placed.

Step 704 includes periodically modulating the optical power of the TAG lens 370 over a range of optical powers at an operating frequency of the TAG lens.

Step 706 includes driving a periodic modulation of the TAG lens system optical power, using a first amplitude driving signal that provides a first amplitude of the periodic modulation at the resonant frequency. The first amplitude corresponds to a first focal Z range extending between peak focus distances Z1max+ and Z1 max−. The first amplitude driving signal is selected based on a first target focus distance Ztarget−1 and stored calibration data, wherein the calibration data relates different amplitude driving signals to different target focus distances Ztarget−i and indicates that the first amplitude driving signal corresponds to the first target focus distance Ztarget−1.

Step 708 includes operating a light source and a camera to expose an image using at least one exposure increment having an exposure increment time interval wherein the focus distance during the exposure increment moves over a first exposure Z range that includes the target focus distance Ztarget−1.

In various implementations, different processes may be utilized for determining the phase calibration data 373*ph* (e.g., which relates Z-heights to phase timings) and the amplitude calibration data 373*am* (e.g., which relates Z-heights to amplitude driving signals having different peak focus distance timings). For example, one exemplary technique for determining phase calibration data for a TAG lens is described in co-pending U.S. application Ser. No. 16/232,874, which is commonly assigned and is hereby incorporated herein by reference in its entirety. As described in the '874 application, the techniques for determining the phase calibration data may involve a number of steps, and may involve certain modeling and may in some instances be relatively complex (e.g., in part due to the high rate of oscillation and for which the phase timings and corresponding determinations must be precise to accurately determine the phase calibration data for the Z-heights).

In contrast, certain portions of the determination of the "amplitude" calibration data may be relatively less complex (e.g., in some instances potentially resulting in certain higher levels of accuracy for certain portions of the amplitude calibration data and/or for which timing may be a less critical factor).

In various implementations, for each amplitude driving signal of the amplitude calibration data, a Z-height that corresponds to the amplitude driving signal may be determined utilizing a specified process (e.g., such as the example process described below) for which the amplitude driving signal may have corresponding level (e.g., a specified voltage level, etc.) that is set (e.g., thus simplifying certain portions of the determination process as compared to the determinations of the exact phase timings during the high rate of oscillation, etc.)

In various implementations, for calibration, imaging, and/or measurement processes, in a configuration utilizing a phase timing on a portion of an oscillation curve with a high rate of change and with a short exposure increment time interval and a short exposure Z range, if the phase timing for the exposure increment is off by a first minimal amount (e.g., such that the actual exposure increment time interval starts after a time when the exposure increment time interval was supposed to end), the exposure Z range may miss and not include a desired target focus distance Ztarget. In contrast, in a system utilizing amplitude calibration data as described herein, the rate of change on the utilized portion of the oscillation curve may be much slower, and the exposure time interval may be much longer. Thus, even if the phase timing for the exposure increment is off by the same first minimal amount, the exposure Z range is more likely to still include the desired target focus distance Ztarget, and a majority of the exposure increment time interval may still provide the intended lighting (e.g., for imaging a workpiece surface at the target focus distance Ztarget).

One exemplary laboratory calibration method to determine the amplitude calibration data may employ a calibration surface (e.g., substituting for the surface of the workpiece 320 of FIG. 3) moved along the optical axis OA to different Z-heights (e.g., in steps of certain increments, such as approximately 0.1 or 0.2 measurement unit steps, for which in various implementations the measurement units may be millimeters, microns, etc.). For each actual calibration Z-height surface position, an amplitude driving signal that results in approximately best focus of the system at the calibration surface may be determined. For example, an image stack may be acquired for a range of amplitude driving signals (e.g., as incremented in small steps over the range), and for which a focus curve may be determined based on focus metric values fm(k,i) calculated for captured images(i) exposed at different Z height positions Z(i) along the z-axis. A peak of the focus curve may indicate an amplitude driving signal that provides the best focus at the calibration surface position at the Z-height. For each stepped position of the calibration surface, the amplitude driving signal and the corresponding actual Z-height position (in microns along the optical axis OA) are then recorded (e.g., and may be further processed according to fit curves etc.) to provide the amplitude calibration data that is stored (e.g., in a look-up table, etc.) in the effective focus position (Z-height vs. amplitude) calibration portion 373*am*.

In various implementations, the stored amplitude calibration data may be utilized for various purposes. For example, in an implementation where it is desired to focus the system at a target Z-height (e.g., where the workpiece surface may be known to be or expected to be, or where an image is to be acquired, etc.), the calibration data may be utilized to determine an amplitude driving signal to be utilized which corresponds to the target Z-height. In another example, during a workpiece measurement operation, a focus curve may be determined (e.g., by obtaining an image stack utilizing different amplitude driving signals) that indicates an amplitude driving signal that best focuses the system at the surface of the workpiece. The best-focus amplitude driving signal may then be referenced against the calibration data to determine the corresponding Z-height of the surface of the workpiece.

In various implementations, for each amplitude driving signal, the calibration data may include two corresponding Z-heights, as corresponding to peak focus distances Z1max+ and Z1 max−, respectively. For example, the process described above may initially include determining calibration data as utilizing exposure increments having an exposure increment time interval that corresponds to peak focus distances Z1max+ of multiple amplitude driving signals. In various implementations, the exposure increment time interval may be approximately centered at the timing of the peak focus distance Z1max+ for each amplitude driving signal. The process may then further include similarly determining calibration data as utilizing exposure increments having an exposure increment time interval that corresponds to peak focus distances Z1 max−. In various implementations, the exposure increment time interval may be approximately centered at the timing of the peak focus distance Z1 max− for each amplitude driving signal.

In some application examples, a workpiece may have first and second surfaces (or a first workpiece may have a first surface and a second workpiece may have a second surface) that are at a first Z-height and a second Z-height, respectively. In various implementations, the first and second surfaces may be stationary or may be moving relative to the field of view during the imaging/measurement process. In various implementations, first and second "target" Z-heights may be established (e.g., as corresponding to the first and second Z-heights of the workpiece surfaces). The system may be configured, and a first amplitude driving signal may be selected (e.g., in accordance with the calibration data) for imaging both surfaces. For example, the first amplitude driving signal with the peak focus distance Z1max+ may correspond to the first target Z-height1 and the first amplitude driving signal with the peak focus distance Z1 max− may correspond to the second target Z-height2. For such a process, in various implementations the system may initially be adjusted (e.g., by utilizing the motor 294 of FIG. 2 to adjust the overall position of the optical assembly portion 205, etc.) so that the middle of the range Refp (e.g., designated as EFPnom) may be approximately in the middle between the first and second target Z heights. The amplitude driving signal may then be selected and/or utilized for imaging the first and second surfaces (e.g., utilizing exposure increment time intervals that are approximately centered at the timing of the peak focus distances Z1max+ and Z1 max−, respectively, as described herein).

As described above in reference to the possible use examples of the calibration data, during a workpiece measurement operation, a focus curve may be determined by obtaining an image stack utilizing different amplitude driving signals, wherein for each amplitude driving signal two images may be obtained, as corresponding to peak focus distances Z1max+ and Z1 max−, respectively. The focus curve may then be utilized to determine an amplitude driving signal with the corresponding peak focus distance (e.g., Z1max+ or Z1 max−) that best focuses the system at the surface of the workpiece. The determined best-focus amplitude driving signal in combination with the corresponding peak focus distance (e.g., Z1max+ or Z1 max−) that produced the best focus may then be looked up in the calibration data to determine the corresponding Z-height of the surface of the workpiece.

Figure 8:
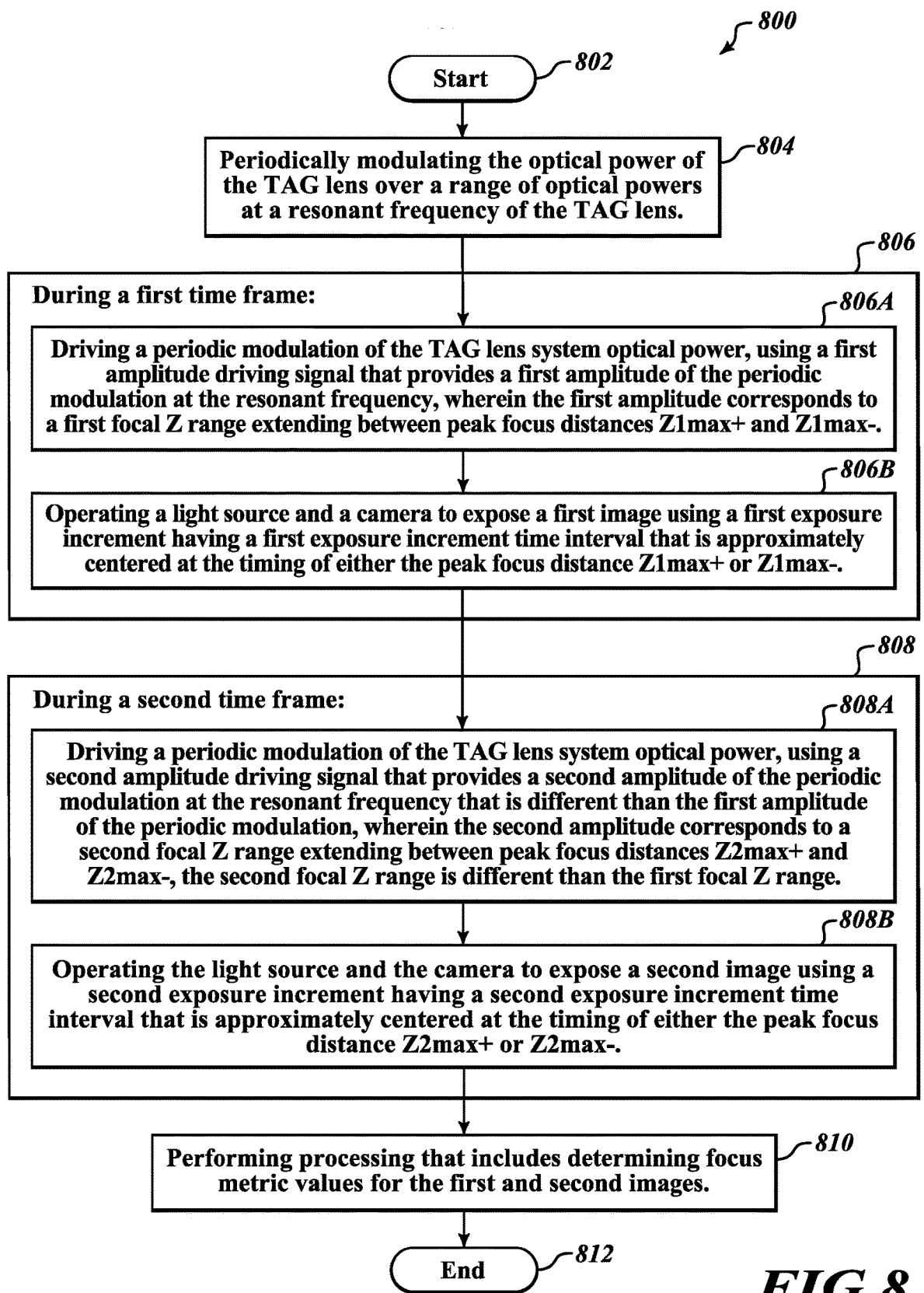
FIG. 8 is a flow diagram showing one example of a method for operating a VFL (TAG) lens system utilizing amplitude adjustments for acquiring images focused at different Z-heights according to principles disclosed herein.

FIG. 8 is a flow diagram showing one example of a method for operating a VFL lens system 300 comprising a TAG lens 370, with a workpiece surface in a measurement/imaging volume of the VFL lens system 300, wherein the measurement/imaging volume may be on or adjacent to the workpiece stage 210 (FIG. 2) on which the workpiece 20 having the workpiece surface is placed.

Step 804 includes periodically modulating the optical power of the TAG lens 370 over a range of optical powers at a resonant frequency of the TAG lens.

In Step 806, during a first time frame, two sub-steps 806A and 806B are performed. Step 806A includes driving a periodic modulation of the TAG lens optical power, using a first amplitude driving signal that provides a first amplitude of the periodic modulation at the resonant frequency. The first amplitude corresponds to a first focal Z range extending between peak focus distances Z1max+ and Z1 max−. Still during the first time frame, step 806B includes operating the light source 330 and camera 360 to expose a first image using a first exposure increment having a first exposure increment time interval that is approximately centered at the timing of either the peak focus distance Z1max+ or Z1 max−.

In step 808, during a second time frame, two sub-steps 808A and 808B are performed. Step 808A includes driving a period modulation of the TAG lens optical power, using a second amplitude driving signal that provides a second amplitude of the periodic modulation at the resonant frequency that is different than the first amplitude of the periodic modulation. The second amplitude corresponds to a second focal Z range extending between peak focus distances Z2max+ and Z2max−, wherein the second focal Z range is different than the first focal Z range. For example, this setting corresponds to FIGS. 6C and 6D described above including the second amplitude driving signal 512 and corresponding modulation 513 that sweeps through the second focal Z range "Focal Z range 2" extending between peak focus distance Z2max+ (Z2) and Z2max−(Z5), while the setting during the first time frame (step 806) described above corresponds to FIGS. 6A and 6B including the first amplitude driving signal 510 and corresponding modulation 511 that sweeps through the first focal Z range "Focal Z range 1" extending between peak focus distance Z1max+ (Z1) and Z1max− (Z6).

Still during the second time frame, step 808B includes operating the light source 330 and camera 360 to expose a second image using a second exposure increment having a second exposure increment time interval that is approximately centered at the timing of either the peak focus distance Z2max+ or Z2max−.

Step 810 includes performing processing that includes determining focus metric values for the first and second images. In various implementations, the processing includes comparing the focus metric values for the first and second images. In various implementations, the processing includes determining that a focus metric value for the second image is higher than a focus metric value for the first image. For example, the focus metric values may involve a calculation of the contrast or sharpness of a region of interest in each of the first and second images, and the focus metric values may be compared to determine which of the first and second images is in better focus.

In various implementations of the method of FIG. 8, the TAG lens system 300 may be operated to acquire a stack of images, which are exposed at respective discrete focus positions FP using different amplitude driving signals corresponding to different Z heights (corresponding to the discrete focus positions FP), and determine a Z height of a workpiece surface by utilizing the stack of images. For example, a focus position may move through a range of Z height positions Z(i) along the z-axis (the focusing axis) and the TAG lens system 300 (including the camera 360) may use different amplitude driving signals (i) to capture images (i) at different positions Z(i) as part of an image stack. For each captured image(i), a focus metric fm(k,i) may be calculated based on a region or sub-region of interest ROI(k) (e.g. a set of pixels) in the image. The focus metric fm(k,i) are related to the corresponding position Z(i) of the focus at the time that the image is captured. This results in focus curve data (e.g. the focus metrics at the positions Z(i)), which may be referred to simply as a "focus curve" or "autofocus curve". In one embodiment, the focus metric values may involve a calculation of the contrast or sharpness of the region of interest in the image. The Z-height corresponding to the peak of the focus curve, which corresponds to the best focus position along the Z axis, is the Z height for the region of interest used to determine the focus curve.

When a focus metric value is based on contrast as noted above, one way to determine the contrast is to evaluate each pixel of the image, and compare its color/brightness with the neighboring pixels. The image with the highest overall contrast may be determined to be the image in the best focus, and a Z focus position corresponding to the best focus image may be determined as the Z height of the surface of the workpiece 320.

In various implementations of the method of FIG. 8, the focus distance during the first exposure increment (step 806) moves over a first exposure Z range that is less than 10% of the first focal Z range. In various implementations, the focus distance during the first exposure increment (step 806) moves over a first exposure Z range that is less than 2 DOF of the VFL lens system. In various implementations, the focus distance during the second exposure increment (step 808) moves over a second exposure Z range that is less than 10% of the first focal Z range. In various implementations, the focus distance during the second exposure increment (step 808) moves over a second exposure Z range that is less than 2 DOF of the VFL lens system.

In various implementations, the first image and the second image may be part of an image stack obtained by the system operating in a points from focus (PFF) mode, and the focus metric values are processed to determine a Z-height of the first workpiece surface. Briefly, in the PFF mode, the TAG lens system 300 is operated to expose a stack of images (an image stack) using an exposure sequence involving different amplitude driving signals. The PFF image exposure sequence defines a plurality of discrete image exposure increments acquired at respective discrete focus positions FP corresponding to respective amplitude driving signals used to drive the periodic modulation of the TAG lens optical power. The plurality of discrete image exposure increments may be each determined by a respective instance of a light source strobe operation that has a respective controlled timing defined in the PFF image exposure sequence. The image stack is processed to determine or output a Z height coordinate map (e.g. a point cloud) that quantitatively indicates a set of 3 dimensional surface coordinates corresponding to a surface shape of the workpiece 20.

It may be desirable/advantageous in some implementations (e.g., for certain implementations in which PFF is utilized) to have the first exposure increment time interval (in step 806) be equal to the second exposure increment time interval (in step 808), while for certain other implementations (e.g., related to general autofocus, etc.) it may be acceptable or desirable for the first exposure increment time interval to differ from the second exposure increment time interval (e.g., for which the exposure increment time intervals may vary for the images throughout an image stack). In some implementations, it may be desirable to have a first exposure increment time interval utilized for the acquisition of a first set of images in an image stack, and a second exposure increment time interval (i.e., that is different than the first exposure increment time interval) utilized for the acquisition of a second set of images in an image stack. For example, in one implementation alternating exposure/light pulse durations (i.e., exposure increment time intervals) may be utilized for acquiring alternating images in an image stack (e.g., with a first exposure increment time interval utilized for odd numbered images in the image stack and a second exposure increment time interval utilized for even numbered images in the image stack). Such an implementation may in some applications provide high dynamic range imaging. High dynamic range imaging would permit a single height map computation on fields of view including both very dark and very bright features of interest at the same time without having to acquire two separate image stacks with different desired exposures for such features (e.g., providing more exposure for dark features and less exposure for bright features, etc.)

In various implementations, the method of FIG. 8 may further include, during a third time frame, adjusting the TAG lens controller to drive the periodic modulation of the TAG lens optical power at the resonant frequency of the TAG lens, using a third amplitude driving signal that provides a third amplitude of the periodic modulation at the resonant frequency that is different than the first amplitude and the second amplitude of the periodic modulation. The third amplitude corresponds to a third focal Z range extending between peak focus distances Z3max+ and Z3max−, wherein the third focal Z range is different than the first focal Z range and the second focal Z range. Still during the third time frame, the method includes operating the light source and camera to expose a third image using a third exposure increment having a third exposure increment time interval that is approximately centered at the timing of either the peak focus distance Z3max+ or Z3max−. For example, this setting during the third time frame may correspond to FIGS. 6E and 6F described above including the third amplitude driving signal 514 and corresponding modulation 515 that sweeps through the third focal Z range "Focal Z range 3" extending between peak focus distance Z3max+ (Z3) and Z3max−(Z4).

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A variable focal length (VFL) lens system, comprising:
a tunable acoustic gradient (TAG) lens;
a TAG lens controller that controls the TAG lens to periodically modulate the optical power of the TAG lens over a range of optical powers at an operating frequency;
a light source;
an objective lens that inputs workpiece light arising from a first workpiece surface, which is illuminated by the light source, and transmits the workpiece light along an imaging optical path that passes through the TAG lens;
a camera that receives the workpiece light transmitted by the TAG lens along the imaging optical path and provides a corresponding workpiece image exposure;
a memory for storing programmed instructions; and
one or more processors to execute the programmed instructions to perform operations including:
during a first timeframe:
operating the TAG lens controller to drive a periodic modulation of the TAG lens optical power at a resonant frequency of the TAG lens, using a first amplitude driving signal that provides a first amplitude of the periodic modulation at the resonant frequency, the first amplitude corresponding to a first focal Z range extending between peak focus distances Z1max+ and Z1 max−; and
operating the light source and camera to expose a first image using a first exposure increment having a first exposure increment time interval that is approximately centered at the timing of either the peak focus distance Z1max+ or Z1 max−;
during a second timeframe:
adjusting the TAG lens controller to drive the periodic modulation of the TAG lens optical power at the resonant frequency of the TAG lens, using a second amplitude driving signal that provides a second amplitude of the periodic modulation at the resonant frequency that is different than the first amplitude of the periodic modulation, the second amplitude corresponding to a second focal Z range extending between peak focus distances Z2max+ and Z2max−, wherein the second focal Z range is different than the first focal Z range; and
operating the light source and camera to expose a second image using a second exposure increment having a second exposure increment time interval that is approximately centered at the timing of either the peak focus distance Z2max+ or Z2max−; and
performing processing that includes determining focus metric values for the first and second images.

2. The system of claim 1, wherein the processing includes comparing the focus metric values for the first and second images.

3. The system of claim 1, wherein the processing includes determining that a focus metric value for the second image is higher than a focus metric value for the first image.

4. The system of claim 1, wherein the focus distance during the first exposure increment moves over a first exposure Z range that is less than 10% of the first focal Z range.

5. The system of claim 1, wherein the focus distance during the first exposure increment moves over a first exposure Z range that is less than 2 DOF (depth of field) of the system.

6. The system of claim 1, wherein the focus distance during the second exposure increment moves over a second exposure Z range that is less than 10% of the first focal Z range.

7. The system of claim 1, wherein the first exposure increment time interval is equal to the second exposure increment time interval.

8. The system of claim 1, wherein the first exposure increment time interval is different than the second exposure increment time interval.

9. The system of claim 1, wherein the first image and the second image are part of an image stack obtained by the system operating in a points from focus (PFF) mode, and the focus metric values are processed to determine a Z-height of the first workpiece surface.

10. The system of claim 1, wherein the one or more processors are configured to execute the programmed instructions to perform operations further including:
during a third timeframe:
adjust the TAG lens controller to drive the periodic modulation of the TAG lens optical power at the resonant frequency of the TAG lens, using a third amplitude driving signal that provides a third amplitude of the periodic modulation at the resonant frequency that is different than the first amplitude and the second amplitude of the periodic modulation, the third amplitude corresponding to a third focal Z range extending between peak focus distances Z3max+ and Z3max−, wherein the third focal Z range is different than the first focal Z range and the second focal Z range; and operate the light source and camera to expose a third image using a third exposure increment having a third exposure increment time interval that is approximately centered at the timing of either the peak focus distance Z3max+ or Z3max−; and perform processing that includes determining focus metric values for the first, second and third images.

11. A method for operating a variable focal length (VFL) lens system comprising a tunable acoustic gradient (TAG) lens and with a workpiece surface in a measurement/imaging volume of the VFL lens system, the method comprising:

(a) periodically modulating the optical power of the TAG lens over a range of optical powers at a resonant frequency of the TAG lens;

(b) during a first timeframe:
driving a periodic modulation of the TAG lens optical power, using a first amplitude driving signal that provides a first amplitude of the periodic modulation at the resonant frequency, the first amplitude corresponding to a first focal Z range extending between peak focus distances Z1max+ and Z1 max−; and operating a light source and a camera to expose a first image using a first exposure increment having a first exposure increment time interval that is approximately centered at the timing of either the peak focus distance Z1max+ or Z1 max−;

(c) during a second timeframe:
driving a periodic modulation of the TAG lens optical power, using a second amplitude driving signal that provides a second amplitude of the periodic modulation at the resonant frequency that is different than the first amplitude of the periodic modulation, the second amplitude corresponding to a second focal Z range extending between peak focus distances Z2max+ and Z2max−, wherein the second focal Z range is different than the first focal Z range; and operating the light source and camera to expose a second image using a second exposure increment having a second exposure increment time interval that is approximately centered at the timing of either the peak focus distance Z2max+ or Z2max−; and (d) performing processing that includes determining focus metric values for the first and second images.

12. The method of claim 11, wherein the processing includes comparing the focus metric values for the first and second images.

13. The method of claim 11, wherein the processing includes determining that a focus metric value for the second image is higher than a focus metric value for the first image.

14. The method of claim 11, wherein the focus distance during the first exposure increment moves over a first exposure Z range that is less than 10% of the first focal Z range.

15. The method of claim 11, wherein the focus distance during the first exposure increment moves over a first exposure Z range that is less than 2 DOF (depth of field) of the VFL lens system.

16. The method of claim 11, wherein the focus distance during the second exposure increment moves over a second exposure Z range that is less than 10% of the second focal Z range.

17. The method of claim 11, wherein the first exposure increment time interval is equal to the second exposure increment time interval.

18. The method of claim 11, wherein the first exposure increment time interval is different than the second exposure increment time interval.

19. The method of claim 11, wherein the first image and the second image are part of an image stack obtained by the VFL lens system operating in a points from focus (PFF) mode, and the focus metric values are processed to determine a Z-height of the first workpiece surface.

20. The method of claim 11, further comprising:
(e) during a third timeframe:
driving a periodic modulation of the TAG lens optical power, using a third amplitude driving signal that provides a third amplitude of the periodic modulation at the resonant frequency that is different than the first amplitude and the second amplitude of the periodic modulation, the third amplitude corresponding to a third focal Z range extending between peak focus distances Z3max+ and Z3max−, wherein the third focal Z range is different than the first focal Z range and the second focal Z range; and operating the light source and camera to expose a third image using a third exposure increment having a third exposure increment time interval that is approximately centered at the timing of either the peak focus distance Z3max+ or Z3max−; wherein the processing performed in (d) includes determining focus metric values for the first, second, and third images.

* * * * *